United States Patent [19]
Carter, Jr.

[11] Patent Number: 5,879,110
[45] Date of Patent: Mar. 9, 1999

[54] METHODS FOR ENCAPSULATING BURIED WASTE IN SITU WITH MOLTEN WAX

[76] Inventor: Ernest E. Carter, Jr., 9702 Garden Row Dr., Sugar Land, Tex. 77478

[21] Appl. No.: 76,044

[22] Filed: May 11, 1998

Related U.S. Application Data

[62] Division of Ser. No. 761,273, Dec. 6, 1996.

[60] Provisional application No. 60/009,065 Dec. 8, 1995.

[51] Int. Cl.⁶ ................ B09B 1/00; E02D 5/18
[52] U.S. Cl. ............ 405/267; 405/57; 405/129; 405/270; 588/249
[58] Field of Search ............... 405/53, 57, 267, 405/268, 270, 129, 264; 588/249, 259

[56] References Cited

U.S. PATENT DOCUMENTS

| | | | |
|---|---|---|---|
| 1,478,865 | 12/1923 | Weber | 405/270 X |
| 4,230,368 | 10/1980 | Cleary, Jr. | 299/2 |
| 4,362,434 | 12/1982 | Valiga et al. | 405/128 |
| 4,491,369 | 1/1985 | Cleary | 299/19 |
| 4,877,358 | 10/1989 | Ressi di Cervia | 405/267 |
| 4,974,425 | 12/1990 | Krieg et al. . | |
| 5,002,431 | 3/1991 | Heymans et al. | 405/128 |
| 5,050,386 | 9/1991 | Krieg et al. . | |
| 5,234,497 | 8/1993 | Crocker | 106/695 |
| 5,542,782 | 8/1996 | Carter, Jr. et al. | 405/129 |
| 5,567,088 | 10/1996 | Shotts et al. | 405/270 |
| 5,569,811 | 10/1996 | Dean | 588/259 X |

*Primary Examiner*—George Suchfield
*Attorney, Agent, or Firm*—Arnold, White & Durkee

[57] ABSTRACT

A method is disclosed for constructing, verifying, and maintaining underground vaults that isolate and contain radioactive burial sites. The method employs a buoyant lift technique to isolate a block of soil containing the contaminates from the surrounding soil. An impermeable synthetic liner is embedded in the vault to enhance the integrity of the system. The integrity of the vault is monitored by a system of sensors placed both inside and outside of the sealed vault. The method eliminates the need to excavate or drill in the contaminated areas.

2 Claims, 16 Drawing Sheets

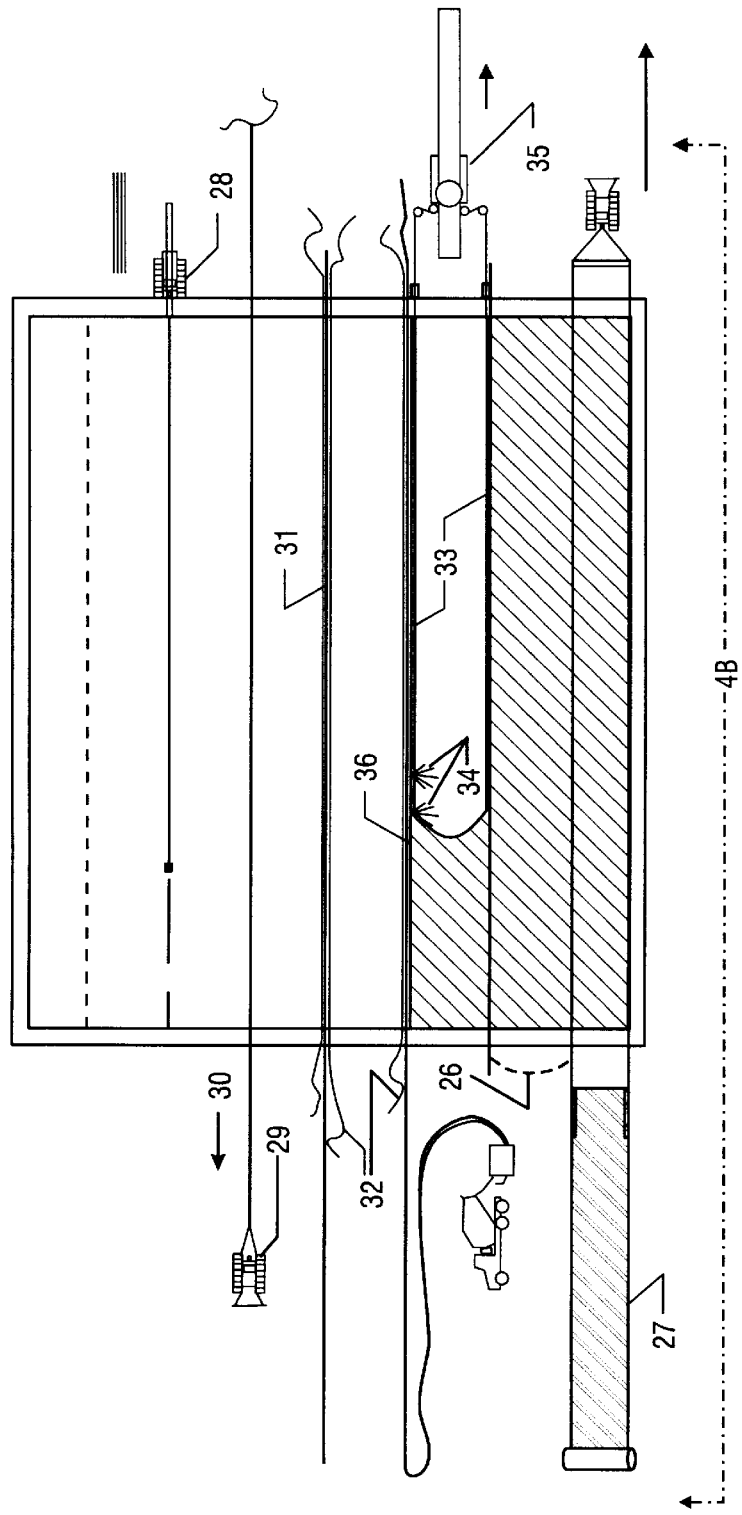
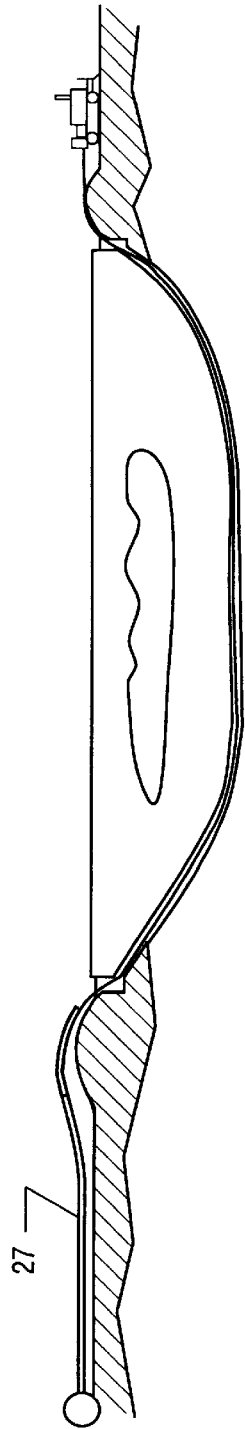
FIG. 4A
FIG. 4B

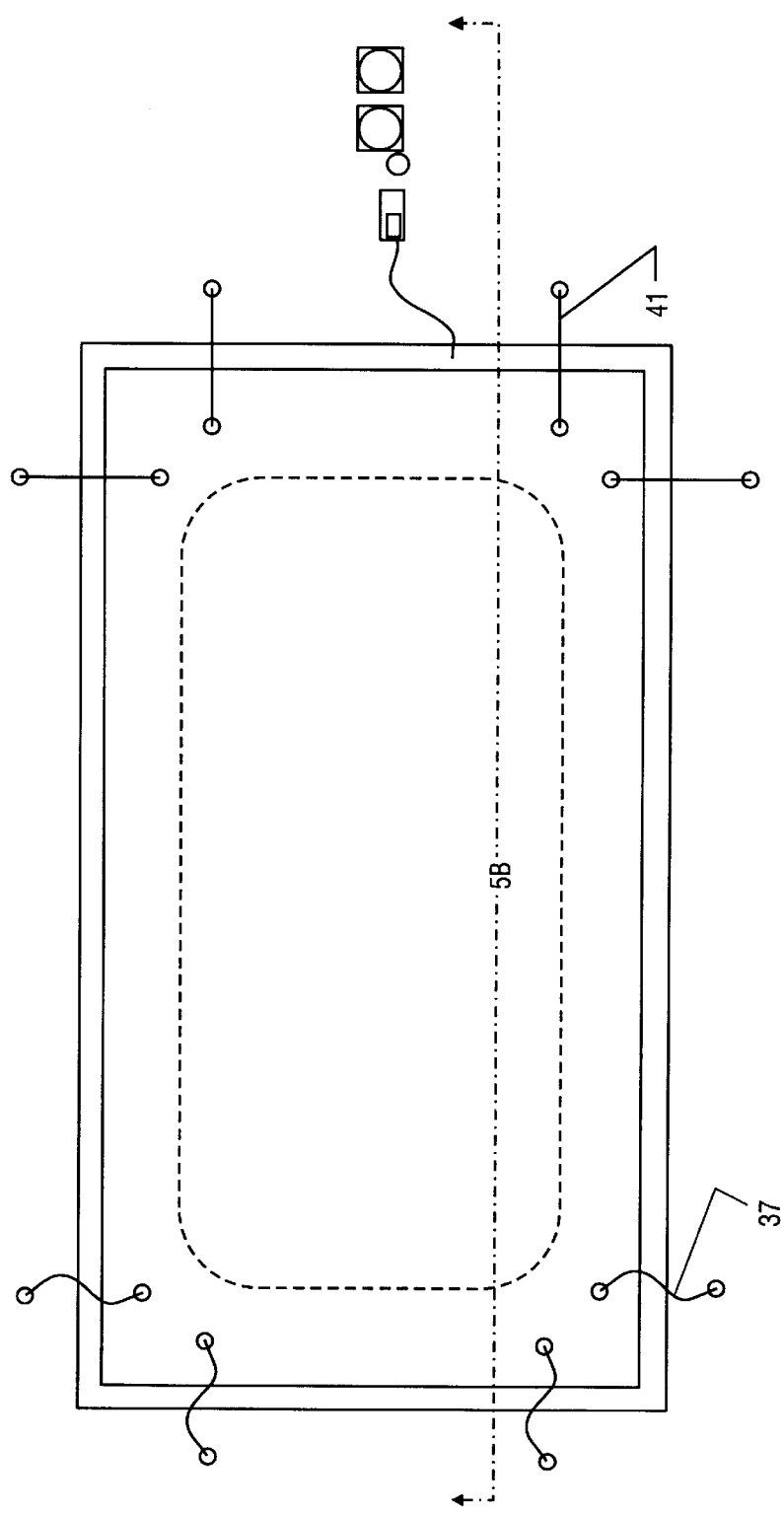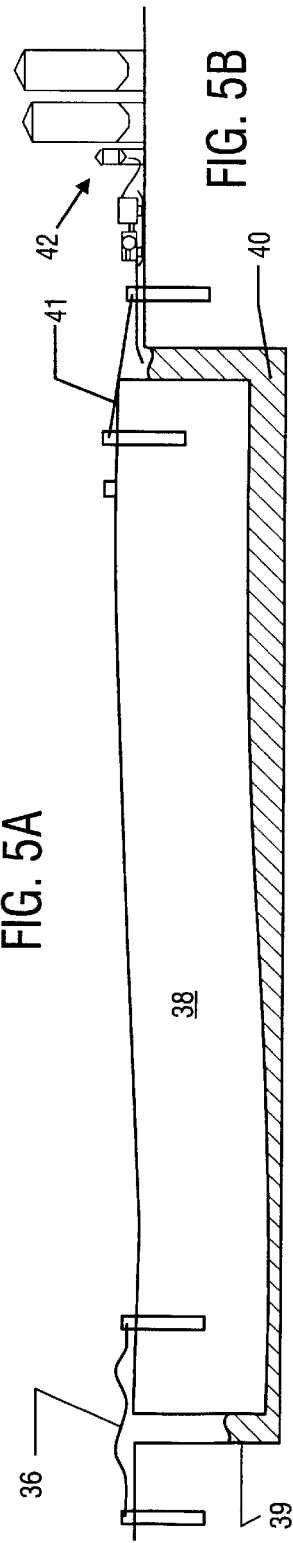

METHODS FOR ENCAPSULATING BURIED WASTE IN SITU WITH MOLTEN WAX

CROSS-REFERENCE TO RELATED APPLICATION

This is a Divisional of co-pending application Ser. No. 08/761,273 filed Dec. 6, 1996. This application claims priority from copending provisional application number 60/009,065 filed on Dec. 8, 1995.

FIELD OF THE INVENTION

The present invention relates generally to apparatus and methods for in situ construction of subsurface containment barriers for containing hazardous waste materials buried under the earth, and more particularly to a method of constructing a vault to encapsulate such hazardous materials so that contaminants are not released into the air or surrounding or underlying strata. The present invention further relates to a means for monitoring the continued integrity of the vault over many years and to a means for repairing any breaches which might occur over time.

BACKGROUND OF THE INVENTION

In the early days of the nuclear age, contaminated debris and undocumented low level radioactive waste were buried in shallow trenches. Other waste materials were placed in underground storage tanks. These burial areas are now considered to pose a unacceptable risk to the environment. Excavation and removal of these wastes is potentially dangerous and very expensive. The concern is that excavation of such sites could release airborne radioactive contaminants which would pose a substantial harm to personnel and nearby residents. There have been a number of solutions proposed for containing these sites. Some of these solutions include slant drilled jet grouting, soil freezing, soil dehydration, tunneling, and chemical grout permeation. Others have taught vertical drilling and hydraulic fracturing as a means of forming a bottom barrier.

U.S. Pat. Nos. 4,230,368 and 4,491,369 to Cleary and others have disclosed the concept of displacing soil blocks containing the contaminants. This is accomplished by making a narrow vertical trench around the perimeter of the soil and forming a horizontal fracture under the site through injection of a fluid under pressure. The horizontal fracture intersects the vertical perimeter trench. A seal is created along the surface areas of the vertical perimeter trench as continued injection of pressurized fluid into the horizontal fracture causes the block of soil within the perimeter to be lifted upwards.

The injected fluid may also become a sealant to produce a barrier surrounding the block like a basement. U.S. Pat. No. 4,230,368 to Cleary discloses that the density of the fluid is a factor in reducing the pressure needed to displace the block but does not contemplate use of fluid densities greater than those achievable with locally excavated soil materials in a clay slurry. This is by definition, less dense than soil. Gel strength of the fluid is mentioned as the primary means of sealing the perimeter opening. Such methods produce both the initial fracture and upward displacement by increasing hydrostatic pressure on the bottom of the block.

The problem with this approach is that hydrostatic pressure will cause fractures to propagate along the plane of least principal stresses. It is not possible to verify the final location and limits of such fractures in a radioactive waste site. The thickness and continuity of such fractures can not be verified. Because of the potential for uncontrolled fracturing into and beyond the contaminated material this method has not been used to produce any type of containment structure in radioactive waste sites.

The inventor's previous invention, U.S. Pat. No. 5,542, 782, which is hereby incorporated by reference, describes a means of cutting vertical and horizontal barriers with high pressure jets of grout slurry and teaches the benefits of constructing such barriers from grout materials which are of a density equal to or greater than that of the overburden. This reference also teaches that the thickness of a horizontal grout barrier may be increased by introduction of a grout slurry which is sufficiently dense so as to result in net upward forces on the soil which heave the land surface upward, however few details of the method or apparatus to accomplish this are described.

SUMMARY OF THE INVENTION

The present invention is directed to improved methods and apparatus for constructing a thick horizontal barrier through buoyant block displacement. The present invention provides a new means for cutting the soil with a cable saw and details a practical apparatus for introducing a block displacement fluid to multiple cuts under a large multi-acre site. The subject invention also provides an improved means of cutting a thin horizontal barrier with high pressure jetting apparatus, which is more practical for application of chemical grouts and has an improved means of joining adjacent cuts to previous ones and recovering from equipment breakage.

The present invention uses a combination of trenching, horizontal directional drilling, diamond wire quarry saw methods, or high pressure jetting to cut a thin gap under and around a block of soil containing the contamination. As this "cut" is formed, it is filled with a high-density, low-viscosity fluid grout. This thin channel of this dense fluid extends back to the surface and so exerts a hydrostatic head against the soil. This proprietary fluid is so heavy that the soil and rock will literally float on a thin layer of the fluid. This keeps the cut open and prevents the weight of the soil block from squeezing the fluid out from under it. After the block has been completely cut loose from the earth, additional dense fluid is pumped and poured into the cut. This additional fluid exerts a buoyant force on the block and causes it to rise out of the earth. The dense fluid is designed to slowly harden over a period of weeks to form an impermeable barrier. Use of the head of the dense grout fluid instead of attempting to pressurize the fluid to support the block is a subtle but important innovation. It eliminates the difficulties of sealing the vertical perimeter trench and also prevents uncontrolled fracturing of the grout into the waste burial area. If any of the grout fluid should find a crack in the active waste area it will do no more than fill it. It can not spurt up to the surface and form fountains of contaminated liquid, as it could do if it were under pressure. While the grout under the block is liquid an impermeable barrier sheet, such as HDPE (high density polyethylene extrusion), may be pulled under the floating block.

After the "moat-like" barrier around the soil block has hardened, a gravity-anchored, air-tight cap structure is built on top of it. The HDPE liner under the block may be fusion bonded to the HDPE liner in the cap to achieve a very high degree of containment integrity. Passive soil gas pressure sensors under the cap and similar sensors in the ground outside the cap monitor the air pressure changes inside the structure as a function of normal atmospheric pressure changes due to weather. This data allows passive monitoring of the integrity of not only the horizontal barrier but also the entire containment structure. Moisture, sound, and chemical tracer levels may be passively monitored as leak and leak location indicators. Repair of damage is also possible by flooding the structure with liquid grout.

A wire saw may also be used with molten paraffin grout to form a thin barrier roughly the thickness of the steel cable. This method maintains a circulating supply of molten paraffin in the pulling pipes which is ejected through holes in the pipe adjacent to the area being cut. The steel cable carries this molten paraffin into the cut and back to the surface. The paraffin is modified with additives that cause it to permeate into tight soils and form a barrier significantly thicker than the cut. Rapid cooling of the grout as the cut proceeds prevent excessive subsidence. An unlimited number of replacement jetting tubes or wire saw cables may be pulled into cutting position by the steel cables or the heated "pulling pipes" which are in the original directionally drilled holes. These may remelt a path through the previous cut.

Improvements on the inventor's previously disclosed method of forming a barrier by high pressure jetting from a long arcuate conduit are also described. The new method forms a very thin cut using chemical grout, such as molten paraffin or molten low density polyethylene, circulated through an catenary arcuate tube at high pressure and rate while the tube itself is reciprocated through directionally drilled holes to the advancing cut. Holes or hardened ports in the forward facing surface of the tube eject the heated liquid into the soil at high kinetic energy causing the soil to be eroded and substantially replaced by the molten paraffin. The tube is also able to perform abrasive cutting. An unlimited number of replacement jetting tubes or wire saw cables may be pulled into cutting position by the heated "pulling pipes" which are in the original directionally drilled holes.

Another improvement over prior art is the use of the above mentioned molten paraffin applied with conventional jet grouting apparatus. The preferred molten paraffin has a melting point between 120° and 180° F. and is modified by the addition of a surfactant which allows the molten paraffin to soak into soils which are already water wet or damp, as well as dry soils which have a very low permeability to water. The paraffin may also be replaced by or blended with a low density polyethylene homopolymer.

Previous inventions have addressed forming impermeable caps, vertical barriers and horizontal barriers but the present invention provides a totally integrated solution which results in total isolation of a waste site from the environment in a manner which is continually and passively verifiable. A subsurface "block" or volume of the earth defined by the ground level on its top and by a bottom comprised of a box-shaped or basin-shaped three dimensional mathematical "surface" which surrounds and underlies the block and rises upward to the ground level at the perimeter, forming a complete and continuous basin and top, fully enclosing the volume of earth in an air-tight, and water vapor-tight vault formed in situ around the block.

A liquid grout with viscosity comparable to motor oil, but which is of greater density than the subterranean "block" such that the block will float in the liquid grout, which will subsequently harden into an impermeable barrier material, and where the hardening of this grout is delayed for an extended period of 6 to 60 days while continuing to transmit hydrostatic pressure effectively. The length of set delay and the density and impermeability of this grout is significantly beyond the performance of the previous art.

Directionally drilled holes which traverse the lower surface of the block in roughly parallel paths and which rise to the ground level and level off to a near horizontal attitude at each end. Such holes being formed in a manner which leaves a tubular steel member or "pipe," and one or more non-crossed steel cables, or two pipes and at least two non-crossed cables in each of the holes extending from ground level at one end of the block to ground level at the opposite end of the block. A mechanical earth cutting means consisting of a flexible length of abrasive tensile member such as a steel cable or chain, The catenary section of which is cooled, cleaned and lubricated by a flow of grout from one or more ports in the adjacent pipes which are moved at intervals in synchronous with the net advance of the cutting means, and which itself is joined end to end and reciprocated or circulated in a continuous substantially horizontal loop between the two adjacent holes by a power driven apparatus that maintains tension on the cutting means against the face of the cut. Prior art has not utilized an abrasive cable saw in curving directionally drilled holes and has not anticipated coolant lines advancing through the holes with the cut.

The initial cutting means and periodic replacement cutting means are pulled into the holes by means of the cables initially attached to the pulling pipes. Pipes which have one or more perforations and are used to convey pressurized grout to the arc of the cable saw cut being formed. Movement of such discharge point being accomplished by moving the pipe through the ground or by moving a smaller inner pipe discharging between straddle packers positioned over one or more holes nearest the arc of the cut.

A perimeter excavated trench filled with the dense grout covers each opening into the directionally drilled holes such that the grout may flow by gravity into those into the annulus between the pulling pipe and the hole and into any narrow cut between them formed by the cutting means. Grout may also flow out to relieve pressure. Flow from the grout filled trenches through the annulus to the cut area may be stimulated by a differential elevation of grout in the trench or the grout may flow from the pressurized grout pipe, which traverses the hole and discharges grout at any desired location along the length of the hole. Excess grout will flow up the annulus to the trench or will contribute to increasing the thickness of the barrier.

The cut through the soil along the lower surface of the block, is filled with a layer of the grout such that the overburden weight is supported by the buoyant force of the grout, and such that the thickness of the cut can be increased by adding additional grout to the excavations. The elevation increase of the block may be controlled by changing the elevation of grout in the trench or by changing the grout density. Restraining means such as steel cables or chains, attached between anchorages on the block and anchorages outside the perimeter trench which act to keep the block floating in the center of the excavation from which the block has been lifted, and to limit the elevation increase of any given section of the block.

While the block is floating free on the layer of dense grout, an impermeable sheet, such as high density polyethylene extrusion (HDPE) heat-fusion-seamed together as is known in the art, is attached by chains or other flexible linkage to two or more of the pulling pipes such that the impermeable sheet may be pulled through the layer of liquid grout under the floating block by pulling the pipes from the opposite end until the sheet extends out of the grout filled perimeter trench on all sides. The sheet is preferably heat-fusion-seamed so as to be wide and long enough to underlie the entire block and the outside berm of the perimeter trench. The outermost portions of the sheet are permitted to pucker into undulating folds to compensate for differences in length of the paths under the block. Sites too large to move in one piece may be laid in the grout as unsealed strips with substantial overlap between strips. Separate strips of this material may be equipped with an slidable mechanical interlock, as is known in the art for vertical sheets such as the GSE Gundwall® Interlock, or Curtain Wall® made by GSE of Houston, Tex., such that one sheet may be slidably attached to adjacent sheets allowing one sheet to be pulled into place and sealed to its neighbor. A sealing compound may later be injected into this joint from the ends.

An air-tight above ground cap, is then constructed and sealed to the hardened surface of the perimeter trench of ,and also preferably to the impermeable sheet. This completes an air-tight containment vault over, under and around the block. The top cap may have a layer of impermeable HDPE sheet which is heat-fusion-seam bonded to the bottom liner rising from the perimeter trench so as to form an air-tight seal between the two sheets. The cap is equipped with: air pressure, humidity, sound, and chemical sensors mounted both in the soil under the cap and on its exterior surface such that differential measurements may be performed and recorded on a continual basis in order to evaluate the degree of isolation between the environment inside the structure and the external environment. A standard data logger device records the data from the sensors may be periodically downloaded to a computer which graphically displays the relationship between internal conditions vs external conditions, as a function of time, temperature and rainfall conditions.

A catenary cutting means similar to the cable saw but operating by a reciprocating stroke implemented with standard construction equipment such as trackhoes may also be used to make the cuts between the directionally drilled holes. The apparatus consists of a flexible hollow tube of substantially uniform diameter extending from the surface down through the directionally drilled holes, joined in a catenary arc, through which high pressure fluid is circulated in a continuous loop, and from which at least a portion of this fluid exits the forward face of the tube through one or more holes or "jets", such that the fluid jet helps erode and wet the soil in the path of the device and allows the fluid to displace substantially all of the soil. The orientation of such fluid jets being cyclically altered to increase the thickness and uniformity of the cut by reciprocating rotation of both ends of the tube an equal increment on each pulling stroke, or by other means substantially in unison such that all soil in the path of the tube can be impacted by one or more fixed jets. The surface of the catenary tube is abrasive and mechanically cuts the soil in its path as well as eroding it with fluid jets. An additional abrasive cable may be pulled into the cut by means of the color-coded, non-crossing cables on the pulling pipe. This cable can bypass the tube and perform an abrasive cutting job and then be withdrawn from either end. The entire cutting tube could also be circulated out of the ground and temporarily replaced by an abrasive cable or chain. If the tube is damaged it can also be replaced in the same manner. This is a major improvement over jet cutting methods which have no recourse when they strike a hard object or if the jets plug. If the jetting tube has substantial enlargements along its length or at the slurry discharge points then it can not be circulated out of the hole if a problem should develop. This ability to recover from a structural failure, jet plugging, or a hard obstruction is critical to commercial use of the process.

The grout material may be either a slow setting dense material capable of buoyantly supporting the overburden or may be a fast set or thermoplastic set material which sets before a large unsupported span exists. A low water, cementitious, latex polymer modified grout with iron oxide additives and a long term set retarder is preferred for buoyant barriers. A molten grouting material made from paraffin wax or polyethylene homopolymer and surfactant admixtures which enable it to mix with damp or wet soils and permeate farther into water impermeable soils is preferred for the non-buoyant process. Circulation of molten grout through the pulling pipes and the catenary tube can keep the material from setting during a work delay or even overnight. Paraffin supply lines from relatively hot and relatively cool but molten paraffin may be blended by a valve to rapidly adjust the temperature of the material with changing ground conditions. Blends of paraffin and polyethylene may also be used. A cap liner made of a similar polyethylene or paraffin mixture may be used in the top cap and heat fusion bonded to the bottom barrier to create a completely air tight seal of similar material. This cap material may be sprayed onto the surface of the cap as a liquid material and cured in place or it may be a prefabricated sheet.

The above mentioned grouts have desirable properties for block encapsulation of buried low level radioactive waste. The molten wax and surfactant blends offer superior permeation into non-homogenous trash as well as good bonding and encapsulation of organic sludges. They offer a desirable matrix to stabilize the waste while it remains in the ground and also prevent airborne dust release during future retrieval. Since they are fully combustible they add no volume to the final waste matrix of a vitrification melter process.

BRIEF DESCRIPTION OF THE DRAWINGS

Other aspects and advantages of the present invention will become apparent upon reading the following detailed description and upon reference to the drawings in which:

FIGS. 4A and 4B illustrate several of the steps performed in forming an impermeable containment barrier under a waste site.

FIGS. 5A and 5B illustrate the use of cables to keep a floating block containing the waste material centered in the excavation.

DETAILED DESCRIPTION OF THE INVENTION

Figure 1:
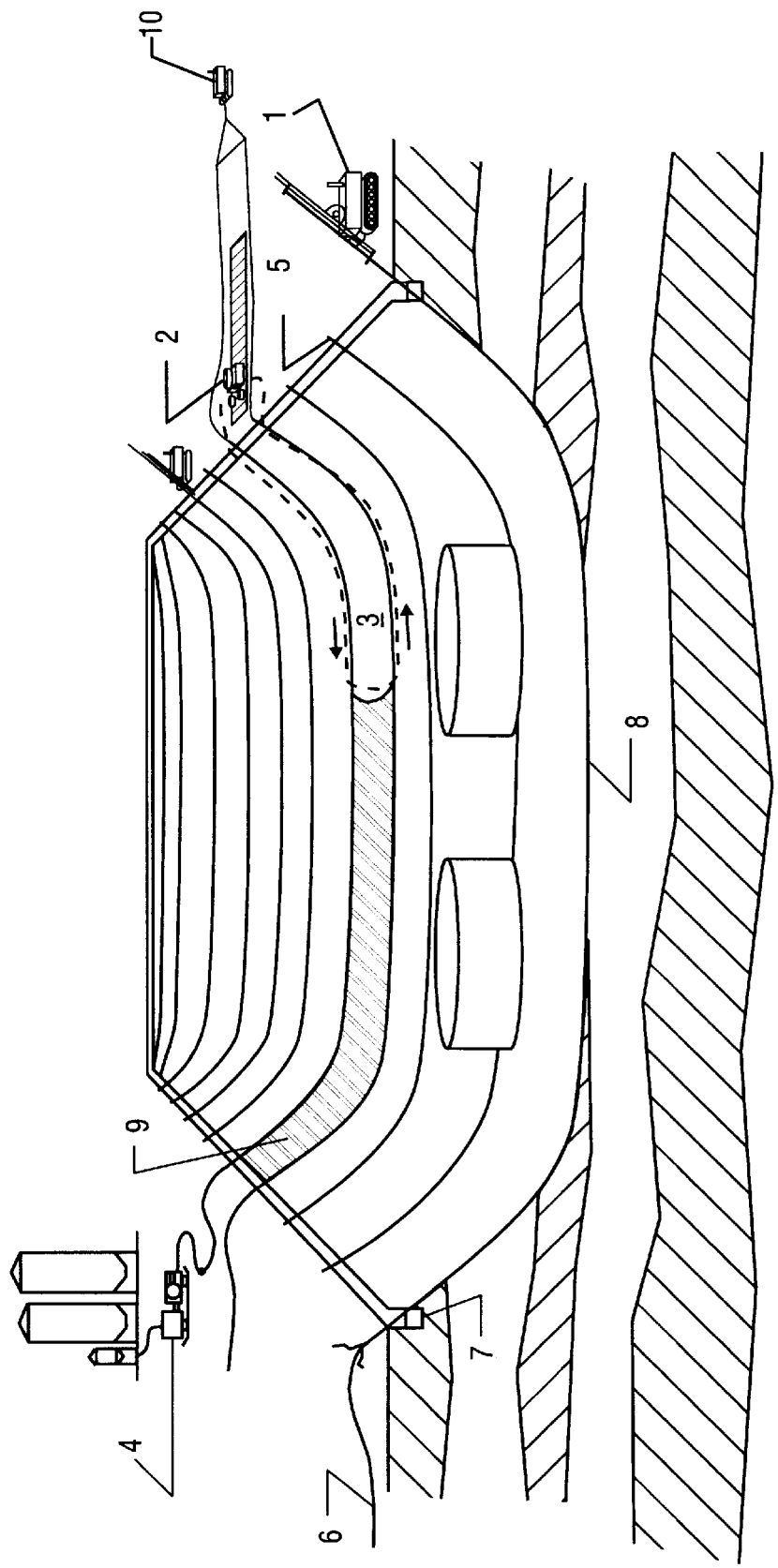
FIG. 1 is a perspective view of a buried tank farm containing toxic waste illustrating directionally drilled holes being placed under the site and a quarry wire saw machine cutting between adjacent holes.

Referring to FIG. 1, a shallow perimeter trench 7 is first excavated around the entire surface perimeter of the block to be isolated. A subsurface "block" or volume of the earth is defined by the ground level on its top and by a bottom comprised of a box-shaped or basin-shaped three dimensional mathematical "surface" which surrounds and underlies the block and rises upward to the ground level at the perimeter, forming a complete and continuous basin, fully enclosing the volume of earth.

A directional drilling machine 1 then drills rows of pilot holes under the site, which define the basin's elongated shape. A pulling pipe with two or more non-crossed cables strapped to it is connected to the drill pipe and pulled through the pilot holes. After this operation each pilot hole contains a pulling pipe and two or more color coded steel cables. Next, a diamond-wire saw machine 2 moves an abrasive cable 3, formed by joined adjacent cables, through the pilot holes cutting a pathway between adjacent pilot holes. The abrasive cable 3 cuts the soil and assists the flow of the grout which carries soil particles to the surface. Pulling pipes 3, 5, and 8 remain in the pilot holes after the paths are cut.

A grout plant 4 pumps grout through one or both of a pair of adjacent pulling pipes to the arc of the cut and also fills the trench 7 with a high density fluid grout. A grout panel 9 is formed as a pulling means, such as a dozer 10, advances the wire saw 2. The level of the grout in the trench 7 and its density applies a hydrostatic force to the bottom of the block.

Figure 2:
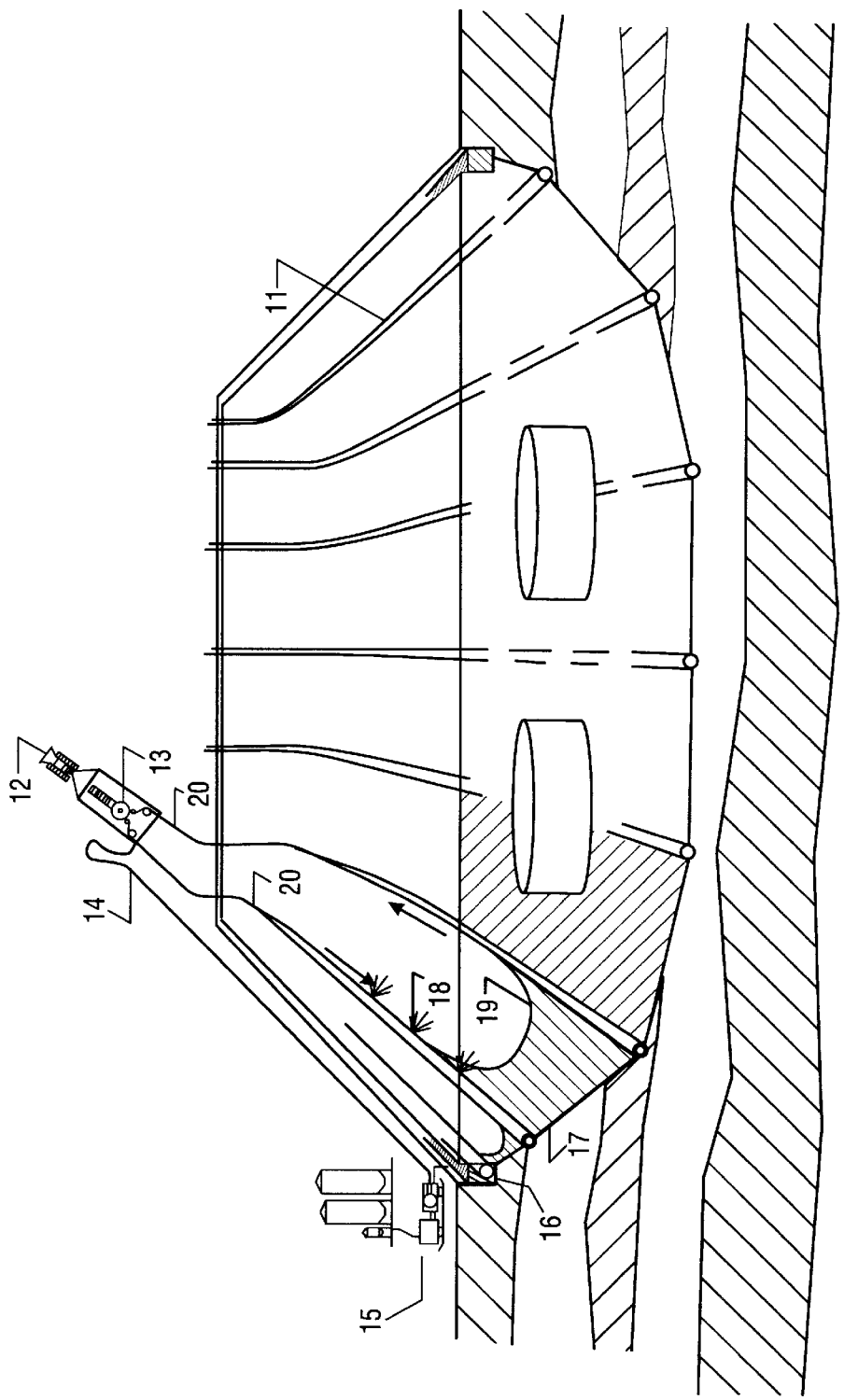
FIG. 2 is an illustration of the formation of an impermeable containment barrier under the tank farm shown in FIG. 1.

FIG. 2 shows the pulling pipes 11 are in place defining a basin. Each pulling pipe 11 has one or more accompanying steel cables which are joined at the cutting end and threaded through a wire saw machine 13 at the other end. The wire saw machine 13 is pulled by a dozer 12. A grout plant 15 supplies pressurized grout to the surface perimeter trench 16 and to one or more of the pulling pipes 11 through the flexible hose 14. The grout exits the pulling pipes 11 through ports 18. The grout cools and lubricates the cable saw 19, and carries cuttings back to the surface perimeter trench 16. The cut 17 is filled with the dense liquid grout, which supports the weight of the overburden soil.

Figure 3:
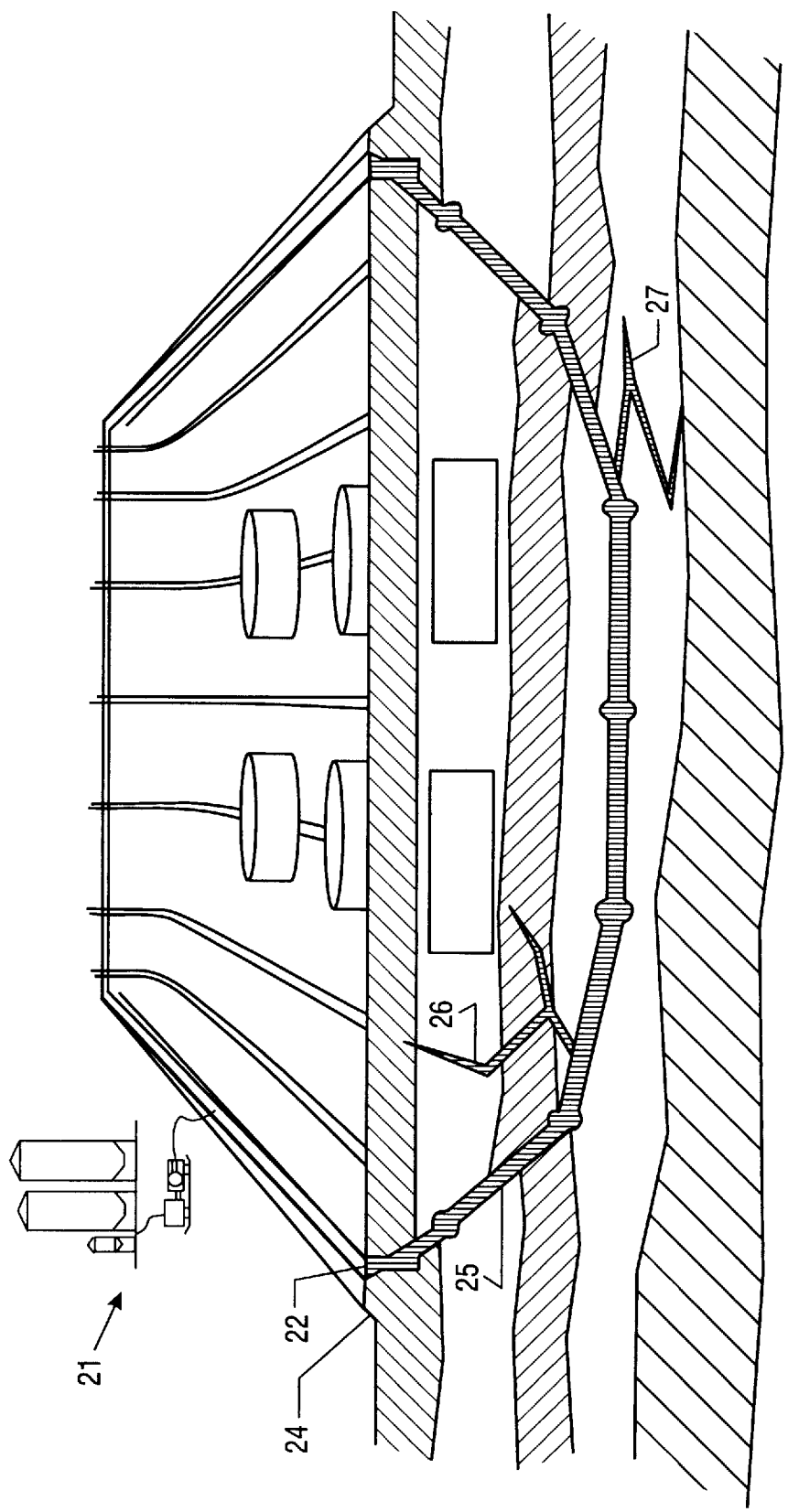
FIG. 3 is an illustration of a completed containment barrier under the tank farm shown in FIG. 1.

Referring to FIG. 3, as the grout plant 21, continues to fill the perimeter trench to an elevation 22, below the elevation of an outer berm 24, the thickness of the cut increases due to buoyancy as the block rises out of the ground. Existing fractures and fissures inside the block will fill with grout but will not extend even in planes of weakness because the hydrostatic forces on the block are balanced. Fissures in the earth outside the block will also be filled with the grout.

FIG. 4 shows a directional drilling machine 28 placing a drill pipe in the ground defining the lower surface of the vault. Long "pulling pipes" are prepared with several steel cables running parallel along the length of the pipe and secured to the pipe by a temporary fastener such as steel bands on the ends and masking tape in the midpoint. The cables have color coded ends and do not cross one another. These pulling pipes are attached to the drill pipe in the holes and pulled into position 31 by a dozer 29, which pulls on the original drill pipe. One of the cables from each adjacent pipe 32 is joined together and threaded through a wire saw machine 35. The cable may be used to draw a more specialized diamond-wire saw cable 33 into the cut. Circulation of this cable and tension applied by the wire saw machine carves a catenary cut through the earth as a supply of grout is pumped down the pulling pipe and exit ports 34 in the vicinity of the cut to cool, lubricate and carry away cuttings. This pipe may be pulled along through the ground as the location of the cut advances. The grout buoyantly increases the thickness of the cut such that a chain or other type of mechanical proving instrument may be pulled through one or more sections of the cut under the now floating block to verify that the barrier is continuous. Additional lengths of pipe are added to the end of the pipe as it is pulled under the block, so that a pipe always remains in position. A roll of a synthetic impermeable sheet, e.g., a high density polyethylene extrusion sheet 27 is then pulled through the liquid grout under the floating block. This may be interlocking sheets pulled in separately, as further explained below, or one large continuous sheet with numerous wrinkles.

FIG. 5B shows a block 38 floating on a layer of grout may not be of uniform density and due to its size may behave somewhat elastically. Steel cables or chains, 36 and 37, may be secured to anchor posts in the block and surrounding it to limit the total upward movement of the block as well as provide a centering effect 41, as the block reaches full elevation. Grout from the plant 42 may fill the trench 40 at one end of the block but due to viscosity and friction effects may not initially fill the trench at the other end 39, thus causing one end of the block to lift first. However, after a period of time the fluid levels will equalize and the block will level.

Figure 6:
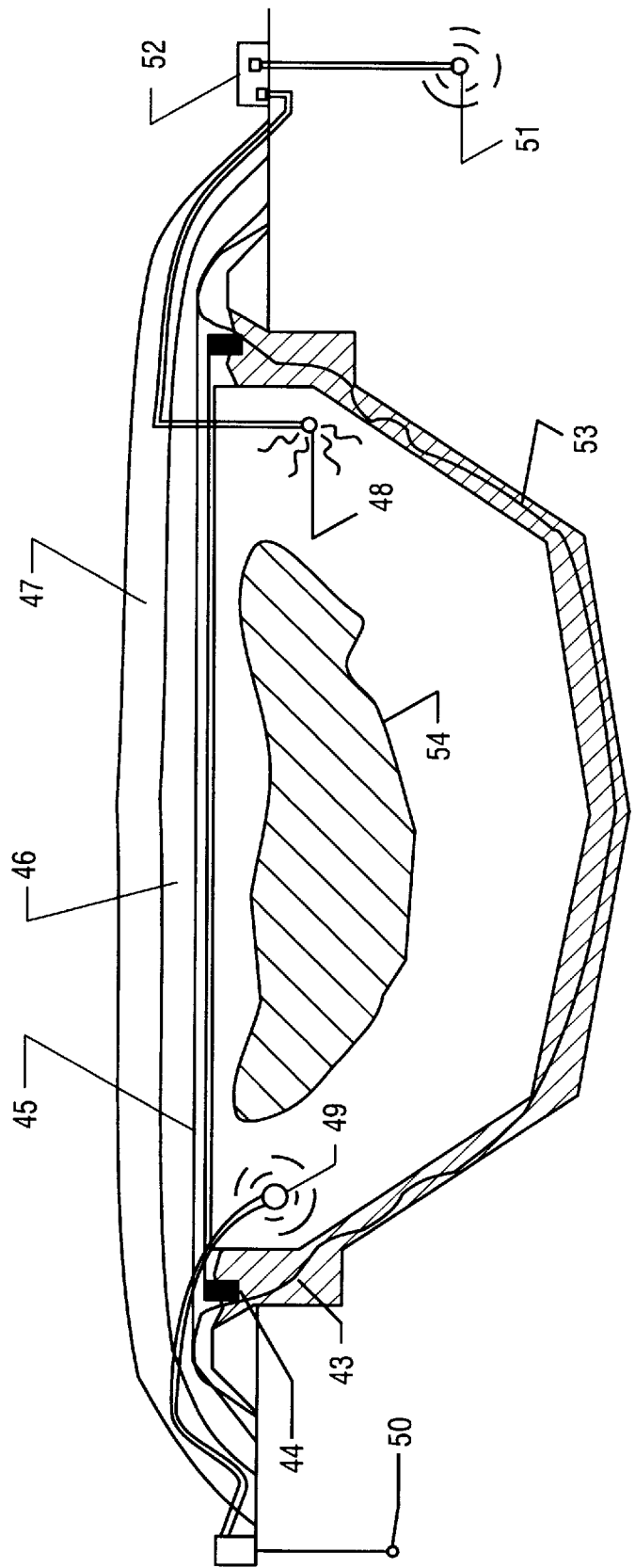
FIG. 6 is an elevation view of the completed containment vault illustrating the system for monitoring containment integrity.

A cap structure is sealed to the hardened grout wall 43 with a resilient material 44 (such as an elastomer or wax) to create an air-tight vault, as shown in FIG. 6. Additionally, the impermeable polyethylene sheet 53, is fusion bonded to a similar polyethylene sheet 45, in the cap structure. This top sheet is covered with layers of sand, concrete 46, clay 47, and topsoil, as is known in the art. The clay and sand are doped with bitter tasting additives to discourage plants, animals and insects from burrowing into it. Air pressure, humidity, temperature, sound and chemical sensors 48, 49, 50, and 51 are buried in the clean perimeter soil inside the vault and also outside the vault. These sensors allow passive measurement of the vault's integrity over time. A port may also be provided to introduce tracer gas into the containment structure.

Figure 7A:
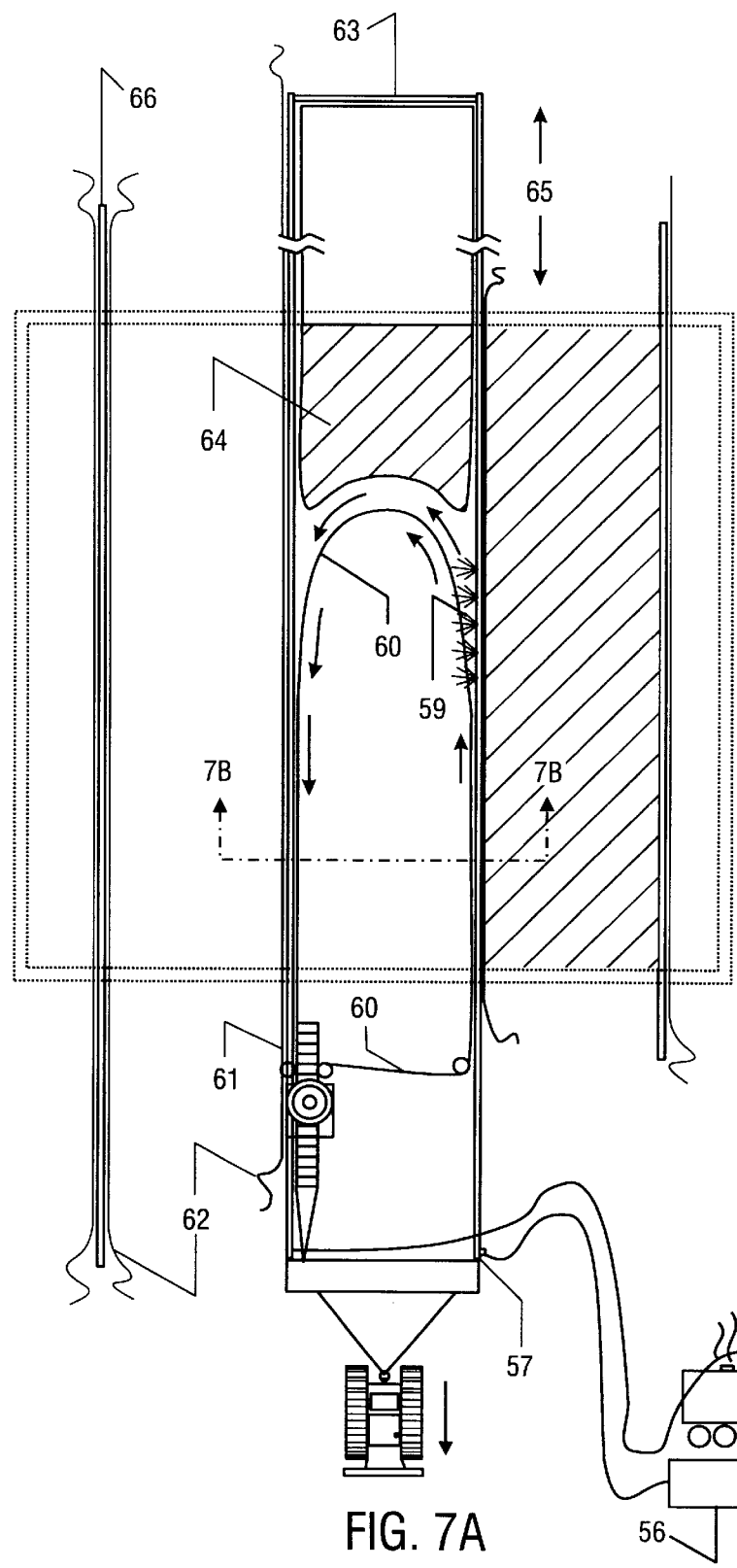
FIGS. 7A and 7B illustrate the formation of barrier panels using an abrasive cable saw which cuts through the earth while molten grout is being supplied by pulling pipes to the cut region.

In an alternate embodiment, the device shown in FIGS. 1 and 2 is modified to include a circulating loop of molten paraffin grout, as shown in FIG. 7A. The molten paraffin grout 55 is circulated by a pump 56 to one of the pulling pipes 57 to a connecting pipe 63 or hose, back through the other pulling pipe and through a hose back to the tanker truck. Holes or jets 59 in the pulling pipe spray the grout into the cutting area to cool and lubricate the cut and to carry away cuttings back to the surface along the annulus outside the pulling pipes. The cutting cable 60 is pulled through the cut by the wire saw 61. The wire saw and the pulling pipes are all attached to a sled which is periodically pulled forward by a dozer. The paraffin grout displaces the soil and hardens a few meters behind the cut of the wire saw, before the length of the cut is wide enough to allow subsidence of the overburden. The paraffin grout is capable of soaking several inches into soils before it hardens and thus the final barrier may be several inches thick. Paraffin supply lines from relatively hot and relatively cool but molten paraffin may be blended by a simple valve to rapidly adjust the temperature of the material with changing ground conditions.

Once the panels are complete the perimeter trench may be excavated by conventional means and filled with molten grout. If the paraffin grout is made sufficiently dense, by addition of iron oxide powder, to provide buoyant force on the block then a perimeter trench may be maintained with molten grout to produce a thick barrier as in FIG. 3. The pulling pipes 66 and cable assembly have a length 65, which is enough to allow one complete pass under the block with the end still exposed.

Figure 7B:
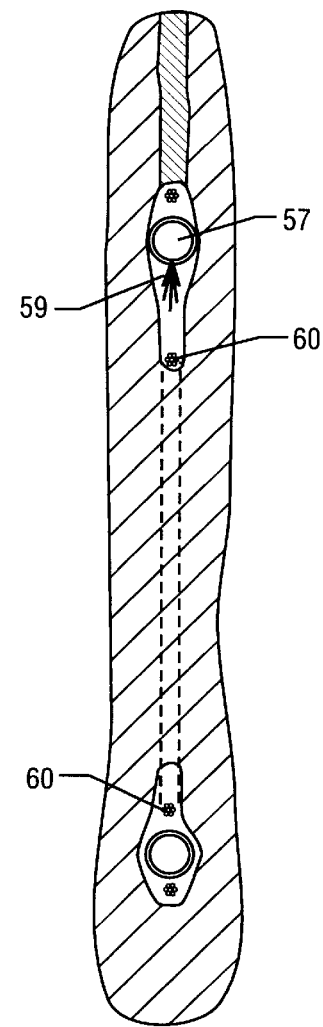
Figure 8:
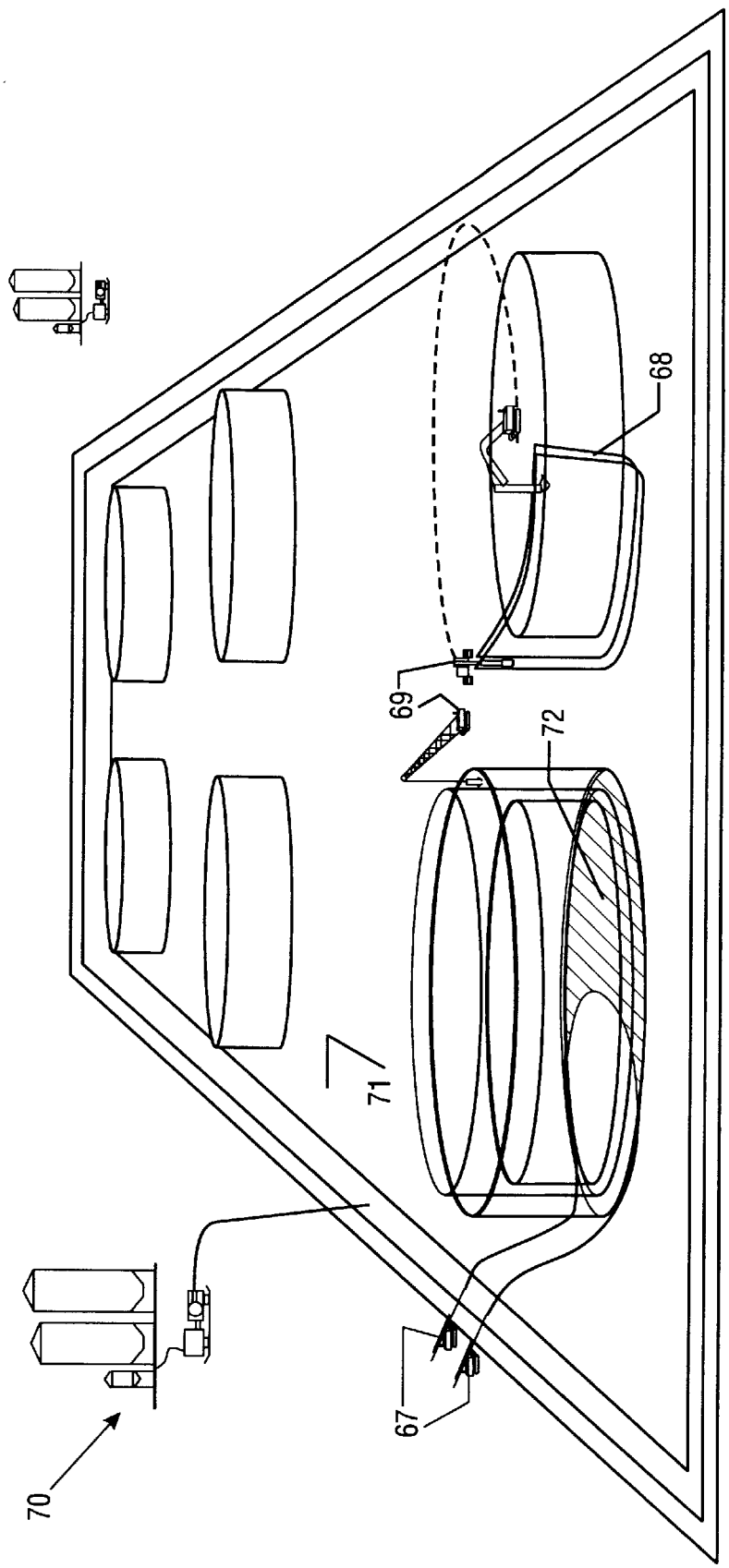
FIG. 8 is a illustration of an alternate method of forming a containment barrier under a buried tank.

In another alternate embodiment according to the present invention, a directional drilling machines 67 place a pipe down into the earth encircling the perimeter of a contaminated soil site below the tank, and then back to the surface, as shown in FIG. 8. Using a cutting means similar to the one shown in FIG. 7, a layer of high density fluid grout from a grout plant 70 is placed in a plane 72 below the tank 71. A perimeter trench is then excavated 68 around the tanks to partial depth and is filled with high density fluid grout. The remaining depth is excavated with a clamshell or trackhoe excavator 69 releasing the block of ground containing the tank which floats upward as the grout flows into the plane under the tank.

Figure 9A:
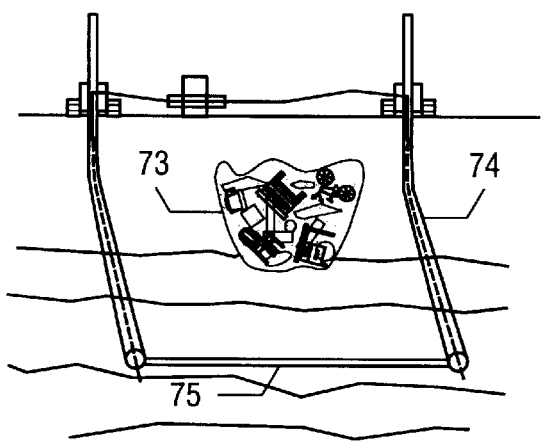
FIGS. 9A–F illustrate the steps in constructing a containment vault around a waste site.
Figure 9B:
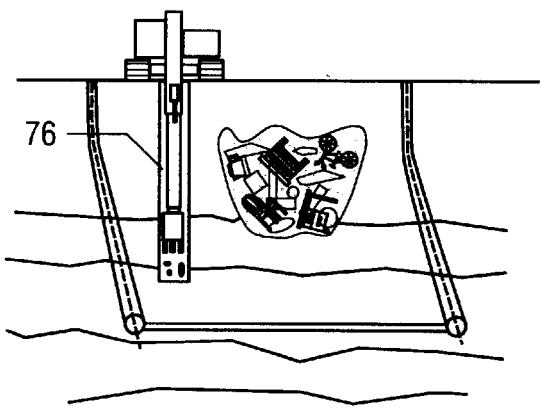
Figure 9C:
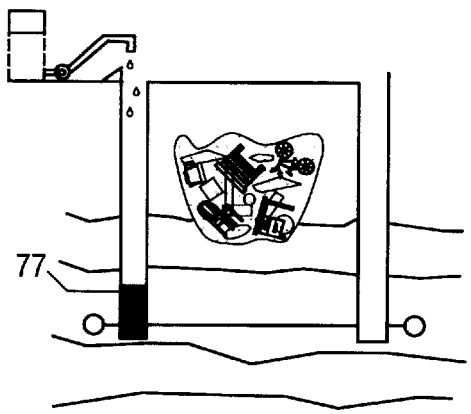
Figure 9D:
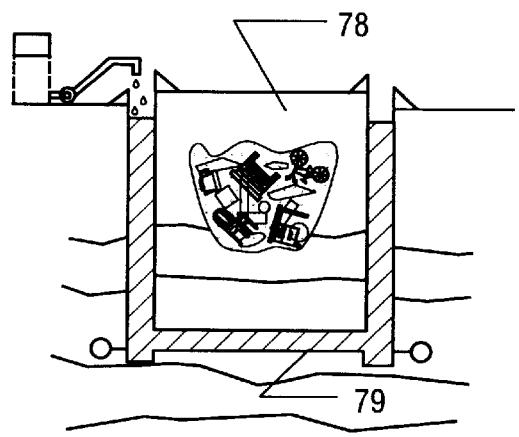
Figure 9E:
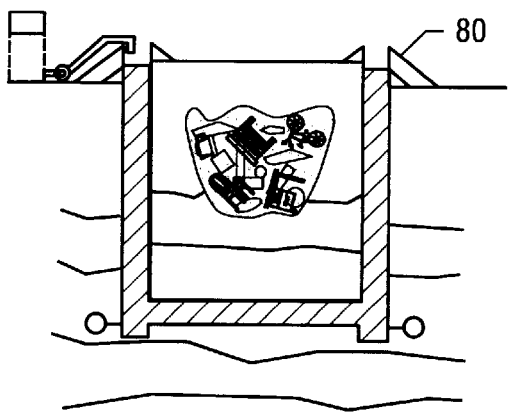
Figure 9F:
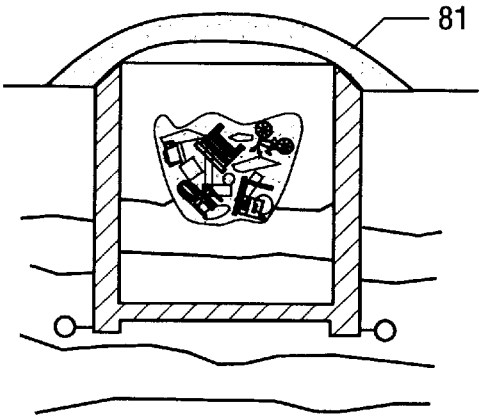

FIGS. 9A–F show a cross-sectional view of a long narrow burial site 73 being undercut and lifted by the method according to the present invention wherein a single pair of pilot holes 74 is employed. First, a wire saw 75 cuts between directionally drilled holes with a dense fluid to form a horizontal cut under a burial trench, as shown in FIG. 9A. Second, a vertical perimeter trench 76 is excavated, as shown in FIG. 9B. Next, the perimeter trench 76 is filled with dense grout 77, as shown in FIG. 9C. The soil block 78 then becomes buoyant and displaces upward to its final position 79, with higher external soil berms in place, as shown in FIGS. 9D and 9E. Lastly, the airtight cap structure 81 is bonded to the below ground barrier, as shown in FIG. 9F.

Figure 10:
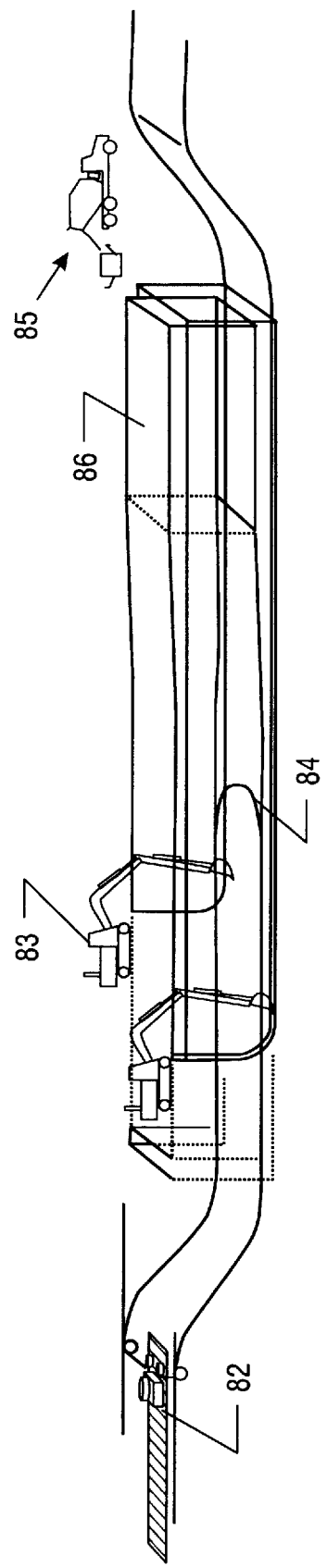
FIG. 10 is a perspective view of the waste site shown in FIGS. 9A–F being undercut and lifted.

In FIG. 10, a long waste site, similar to the one shown in FIG. 9, is being undercut and lifted. An excavator 83 digs a perimeter trench to full depth. A pair of holes are drilled and cased, intersecting one end of the trench and a wire saw cable is looped around the entire block. This could also be done with another trench, but would require more grout. The trench is then filled with a dense liquid grout. A wire saw machine 82 makes a cut 84, which is filled by the grout from the trench, which buoyantly supports the weight of the block. As the cut progresses, the block buoyantly lifts upward to its full floating position.

Figure 11:
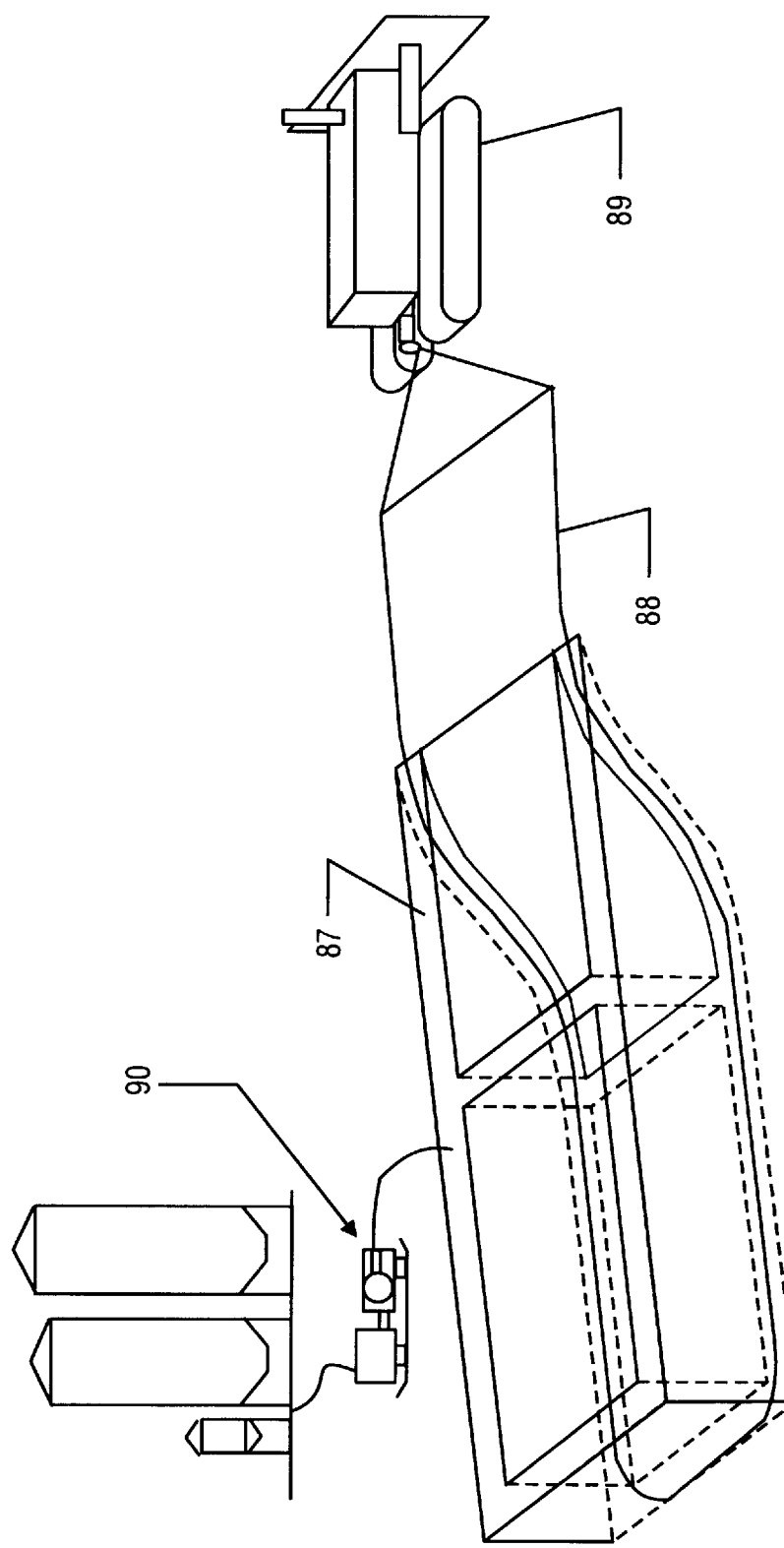
FIG. 11 is a perspective view of a small test block being undercut by pull cables.

In FIG. 11, a small test block is being undercut by the direct pull cable method. The dozer 89 pulls the cable 88 through the soil while the trench 87 is filled with the dense fluid grout supplied by the grout plant 90.

Figure 12A:
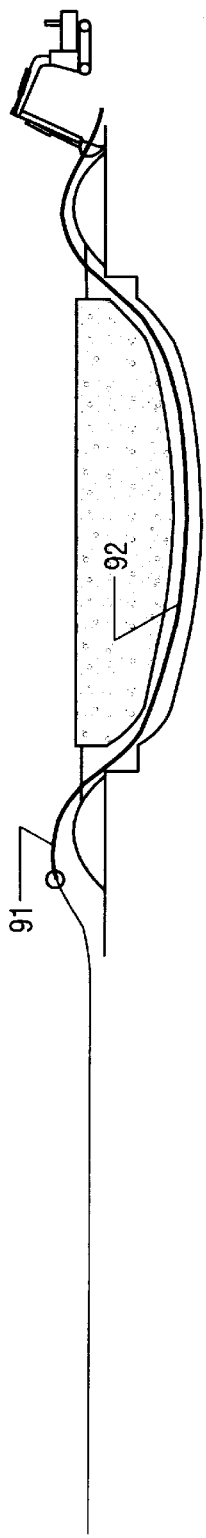
FIGS. 12A–C illustrate the step of placing an impermeable liner sheet in the grout barrier under the block of soil containing the waste material.
Figure 12B:
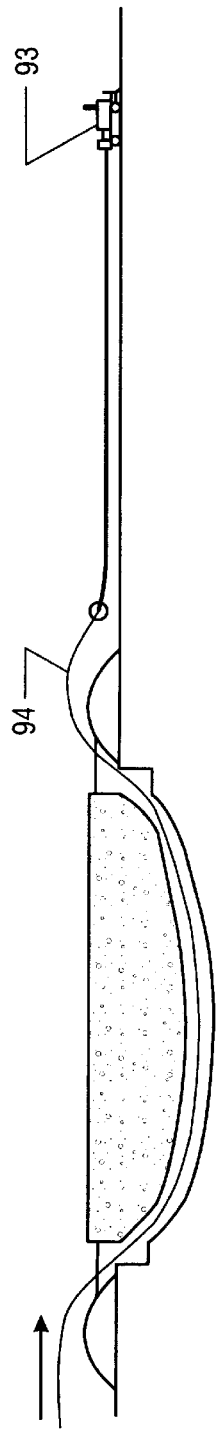
Figure 12C:
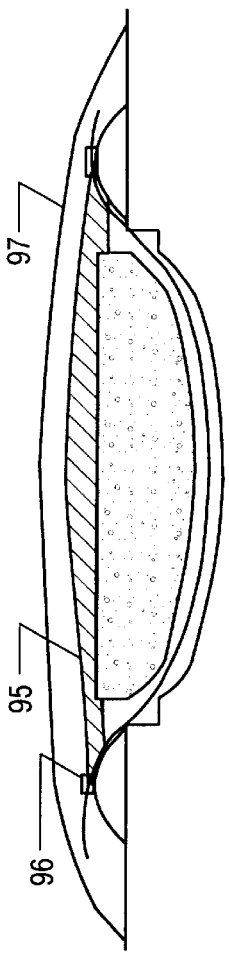

FIGS. 12A–C show the steps of sealing the block with a synthetic impermeable layer. This is accomplished as follows. While the block of soil is floating free on a thick layer of dense grout, a dozer 93 pulls on pulling pipes 92, which in turn pull an impermeable liner sheet 91 completely under the block, as shown in FIG. 12A. The impermeable liner sheet 94 is pulled under the block until it extends over berms on the perimeter, as shown in FIG. 12B. An impermeable top sheet 95 is fusion bonded 96 to the bottom sheet all around the perimeter of the block producing an airtight containment vault, as shown in FIG. 12C.

Figure 13:
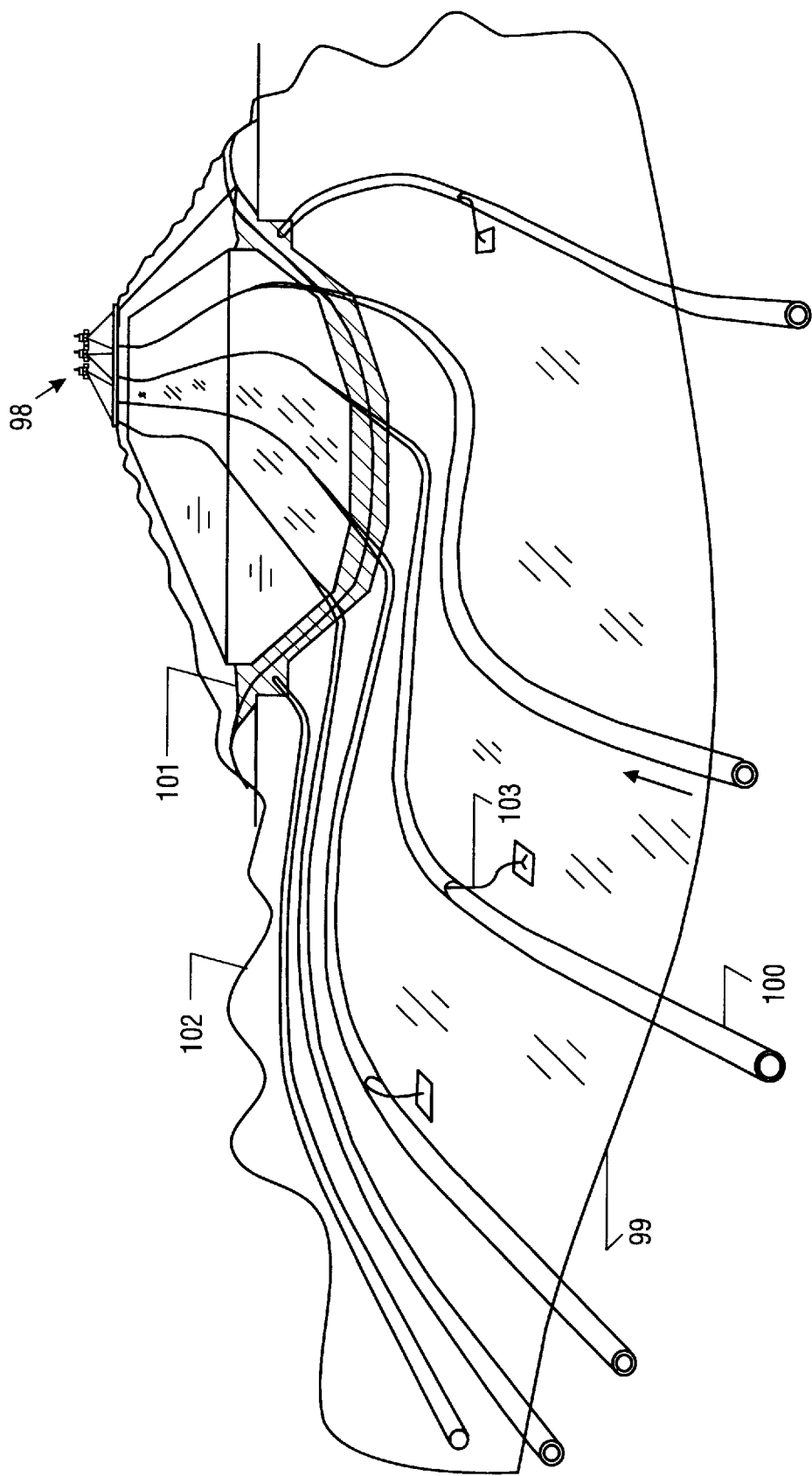
FIG. 13 is a perspective view of the containment site illustrating the step of pulling a large one-piece sheet of impermeable material under the block of soil containing the waste material which is free floating in the dense grout fluid.

In one embodiment, one large sheet 99 is pulled under the free floating block by one or more dozers 98, as shown in FIG. 13. In this embodiment, the pulling pipes 100 are elastically attached 103 to the sheet at intervals. The edges of the sheet are allowed to pucker 102 to compensate for the differences in lengths.

Figure 14:
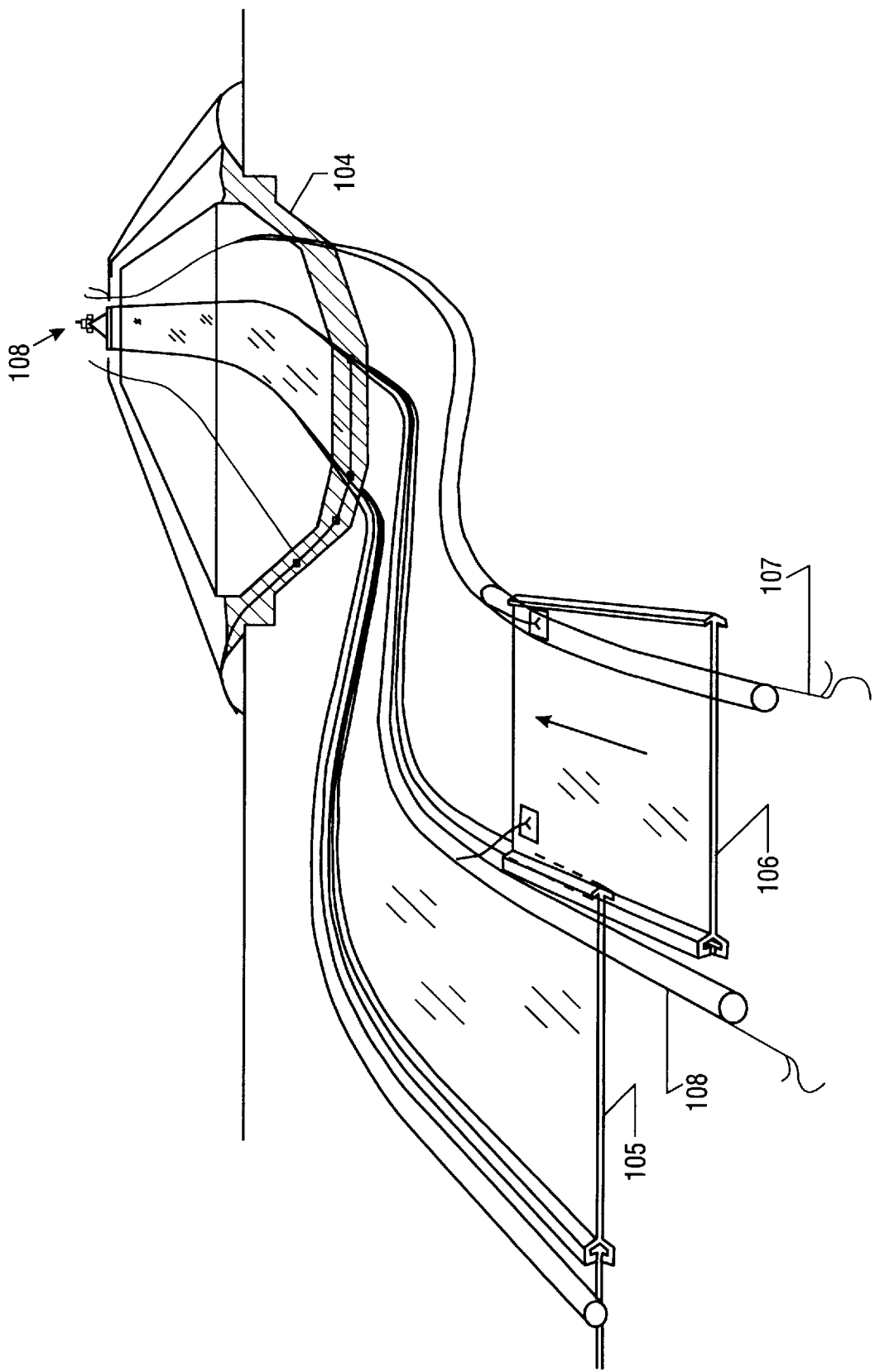
FIG. 14 is a perspective view of the containment site illustrating the step of interlocking adjacent impermeable liner sheets.

In another embodiment, multiple interlocking sheets of the impermeable liner material 105 are pulled under the free floating block by pulling pipes 108, as shown in FIG. 14. The interlock 106 joins the sheets while allowing relative movement as the sheets are pulled through the liquid grout 104.

Figures 15A, 15B:
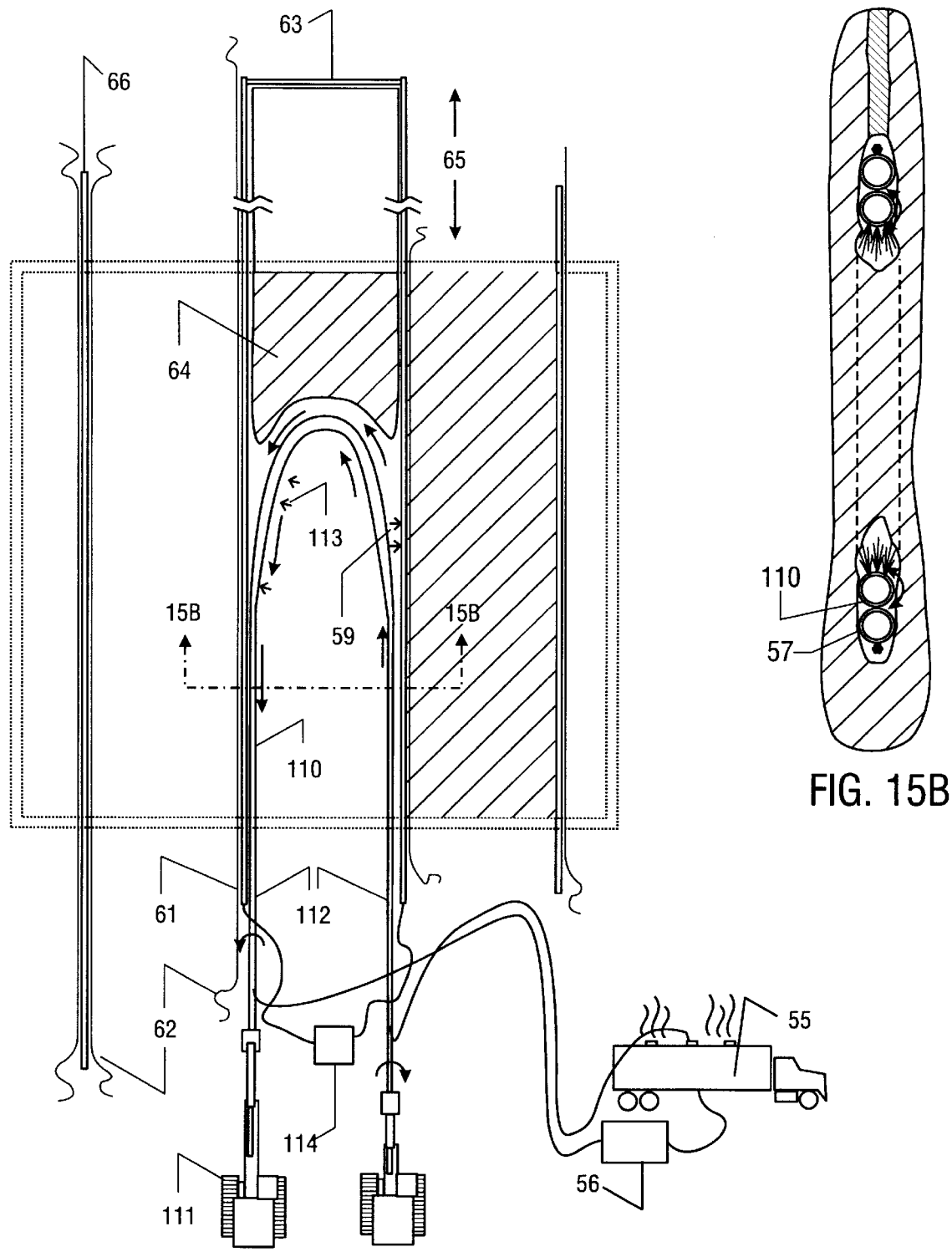
FIGS. 15A and B are a plan and cross-sectional view, respectively, illustrating a catenary cutting step used in one embodiment of the invention to cut and form an impermeable containment barrier.

FIGS. 15A–B show another alternate embodiment of the basic method. This embodiment illustrates a catenary cutting method using a uniform tubular abrasive member 110 and a circulating pressurized fluid 55 directed at the cut as the tubular member is reciprocated around the arc of the cut by the motion of two hydraulic excavator trackhoes. The ends of the tubular member are rotated to allow a single fixed jet to sweep through at least 45° of arc so that it may strike substantially all of the soil in the path of the tubular member, as shown in FIG. 15B. In this embodiment, the tubular member is a flexible high pressure tube of substantially uniform diameter extending from the surface down through the pilot holes and joined in a catenary arc. The high pressure fluid is circulated in a continuous loop and at least a portion of the fluid exits the forward face of the tube through one or more holes or jets such that the fluid jet helps. erode and wet the soil in the path of the device and allows the fluid to displace substantially all of the soil. The orientation of such fluid jets being cyclically altered to increase the thickness and uniformity of the cut by reciprocating rotation of both ends of the tube an equal increment on each pulling stroke, or by other means substantially in unison such that all soil in the path of the tube can be impacted by one or more fixed jets.

Figure 16:
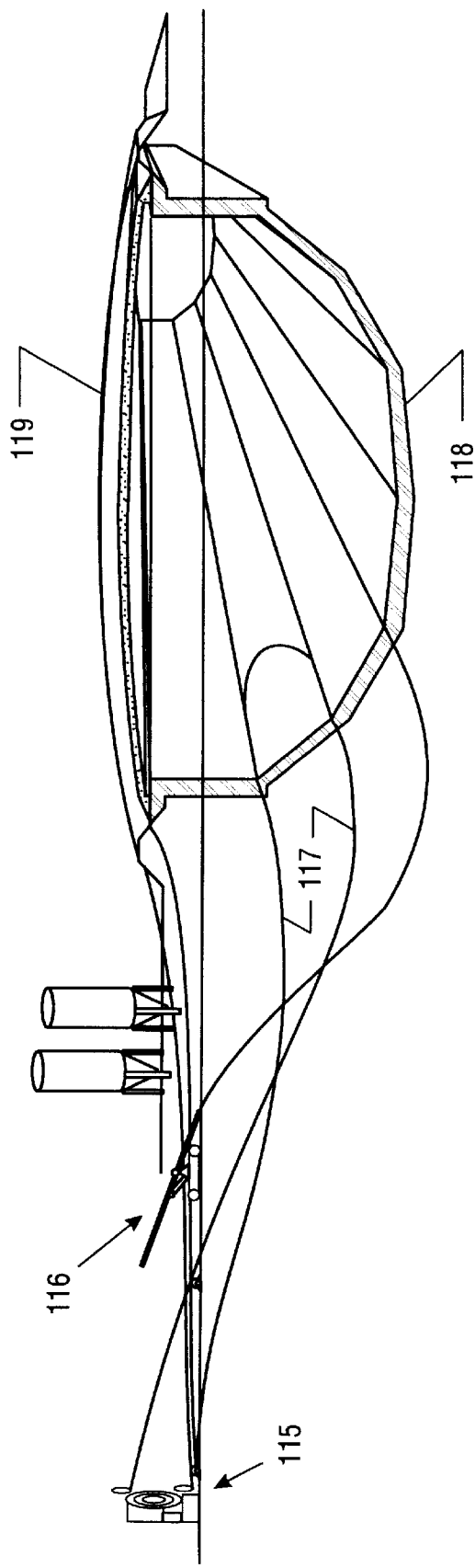
FIG. 16 is a perspective view of the a completed containment vault with a sealed cap structure.

A completed containment structure with the final cap in place is shown in FIG. 16.

Further details of the present invention are described below.

A directional drilling machine 1, such as those used by Eastman Cherrington Co, Houston, Tex., or direct push type machines such as those made by Charles Machine Works, which is known in the art, is used to drill a series of roughly parallel (in plan view) pilot holes 8, under the site. The pilot holes may typically be spaced from 20 to 100 feet apart and do not have to be parallel or equidistant. They need only define the geometry of the barrier to be constructed. The holes typically enter the ground within the trench at an angle, descend to the desired depth, level off and run substantially horizontal, and then rise back to the trench at the opposite end of the block. Steering and verification of the position of such holes is well known in the art. Several such pilot holes would be drilled at intervals across the width of the site at various depths to trace an elongated basin-shaped surface which is substantially below the contaminated rock/soil layer but rises nearly to the surface on the sides and each end, where it intersects the perimeter trench. This perimeter trench may be excavated with a backhoe in conventional manner.

During drilling of these pilot holes any drilling fluid which returns to the surface may be used to verify that the holes are located in uncontaminated soil. If contamination is found, the hole may be plugged and a deeper pilot hole installed. Portions of the hole in unconsolidated soils may optionally be cased with a thin plastic sleeve 5.

After drilling is complete, a pair of saw cables 6, (or jetting tubes, 110) and a "pulling pipe" 7, may be introduced into each pilot hole as the drill pipe 8, is extracted. These two cables (or tubes) are affixed to both ends of the steel pipe. This arrangement helps prevent the cables from crossing each other and provides a means of running replacement cables or injecting grout. The pipes extend up through the trench and over a soil berm to a horizontal position on each end. The steel pipes are preferably 2-3/8 inch oil well tubing with threaded connections as is known in the art. The steel pipe may have one or more small holes drilled in it at intervals. The pipe may optionally be used to convey dense fluid or super dense grout to points along the pilot hole. A smaller pipe with a straddle packer may be moved within the pulling pipe to direct liquid flow to any desired point along the pipe. Preferably the fluid may also be directed to any point by moving the pipe through the ground such that the holes are at the desired position. The pipe may also be used to draw additional wire saw cable into place if a cable breaks in service. The pipes may also be used to pull larger or more powerful wire saw cables or cutting devices or proving bars through the cut after the initial cut is made.

A diamond-wire saw quarry saw such as the Pellegrini TDD 100 G, Verona, Italy, made for the extraction of granite blocks, is set up at one end of the directionally drilled pilot holes. These machines have been in use for many years. The diamond-wire saw is essentially a steel cable with abrasive materials bonded to it at intervals. The wire saw machine is a large power driven cable sheave which maintains tension on the cable and pulls a continuous loop of cable through the cut like a band saw. The diamond-wire saw steel cable from the first hole is joined in a loop back through the second hole to the wire saw machine and joined into a continuous cable. The method of joining steel cables may include a reweaving process which is known in the trade. The cable machine causes the cable to move in a continuous loop through the holes and places tension on the cable to cut a pathway between the first two pilot holes. Diamond abrasive sections of the cable do the cutting in rock, and also cut soil. In applications where rock is not anticipated, the cable abrasives may be optimized for fast soil cutting. A standard aircraft grade steel cable may also be used without abrasives to cut through soft soils. In this specification, the words cable saw, cable, diamond-wire saw, diamond-wire saw quarry saw, and wire saw are used interchangeable to refer to a mechanical cutting means. The cutting fluid may optionally contain a clay dispersing additive such as sodium lignosulphonate or salt, to keep the clay from sticking to the cable. A high pressure fluid jet or mechanical brushes may be set up to continuously clean the cable as it comes out of the ground.

The shallow perimeter trench at each end of the pilot holes is filled with a special cutting fluid or grout which has a density greater than the average density of the waste site soil and a low viscosity. Cutting fluid is circulated through the cut to remove cuttings, cool and lubricate the cable. The cutting fluid is preferably sufficiently dense to support the overburden and prevent the cut from subsiding and also to provide significant net lifting force as well. This fluid may be made from a gelled water combined with a powdered iron oxide to increase its density, or it may be a dense iron oxide modified cement grout with set retarder. The fluid may be introduced into the pilot holes by pumping it down the pulling pipes in the pilot holes to the area of the cut. At this point the fluid exits the pulling pipe through small holes and flows back to the surface, applying a hydrostatic head to the area of the cut. As the wire saw cable moves, it circulates this fluid from the entry side of the cut to the exit side and back to the surface trench. The wire saw cable also carries this fluid into the cut where it picks up cuttings and then returns to the surface trench with the returning cable. The used fluid may be picked up from the exit area of the trench and re-conditioned before placing it back into the trench. The fluid's density and the hydrostatic head from the surface trenches provide a balancing force which prevents the overburden soils from collapsing into the cut which the wire saw makes. The fluid is designed to flow into permeable soils and rock to a very limited degree, while forming a filter cake which the hydrostatic force may act against and support the overburden. The principal is similar to that of a deep horizontal oil well drilled through unconsolidated sands.

If the soil and rock is very abrasive, the cable may be changed several times during a single cut. Broken cables may be replaced by pulling a new set of cables through that pair of holes with the steel pulling pipe which is left in the hole. After the first wire saw cut is complete, the next cut may begin. Each cut has its own cables so if multiple wire saw machines are available many cuts could be completed at the same time. The cable will tend to cut through most rocks and debris in soil. Hard rocks in softer soils may get pushed up or pushed down by the cable. In either case the dense fluid will fill whatever gap is created. For large scale applications a larger diameter cable could be used to make longer and wider cuts.

After the initial cuts have been formed in a given area additional grout may be added to the trench and injected through the pipes. The level of the grout fluid in the trench is gradually increased, which causes more grout fluid to flow into the cut and buoyantly lift the overburden soil as the thickness of the cut slowly and uniformly increases. The concept is like floating a ship out of dry dock. Addition of grout continues until the soil block has risen about 3 feet. See FIG. 2A. At this point the barrier thickness is also about 3 feet. The steel pipes which lie in the tracks of the pilot holes can now be utilized to pull a chain type proving bar or a High Density Polyethylene Extrusion (HDPE) liner under the floating block. See FIG. 5. A large sheet of HDPE could be fabricated by field fusion bonding techniques and pulled under the entire site in one motion. A reinforcing mesh of composite fiber could also be installed in this manner to increase the strength of cement based grout. Post tension cables or nondestructive testing devices could also be installed in the same manner.

Earthen berms may be built up around the outer perimeter of the trench to allow higher grout levels to increase the lift of the block or to allow lift of a site with surface structures, or heavy objects. Anchored cables may be used to provide a force to keep the block floating in the geometric center of the liquid perimeter. See FIG. 6.

Grout Properties And Composition

The proprietary grout will remain fluid for several weeks and then harden into a rock with physical and chemical properties similar to ceramic tile. Properties of this fluid are tailored for the site and are sufficiently "filter cake-forming", that the fluid does not leak into the soil or rock excessively. Permeability of the preferred grout has been demonstrated to be approximately $10^{-8}$ cm/sec. Compressive strength after 6 months is greater than 5000 psi. This grout has near zero shrinkage on set and is highly impermeable. It is suitable for both wet and desert dry conditions. As a liquid the grout has a marsh funnel viscosity less than 120 seconds and typically less than 70 seconds. The grout is inorganic and resistant to nitrate salt migration. A nonhardening version of the grout is also available for use as a cutting fluid in the wire saw operations. When mixed with the hardening version of the grout this dense cutting fluid will also harden.

The special super dense grout is preferably composed of a type K other zero expansion cement to minimize the potential for stress cracking, mixed with water to an initial density of 12 to 20 pounds per gallon. A high density additive, such as barite, brass or copper powder, uranium ore, or steel shot, but preferably iron oxide powder (hematite) such as is known in the art of oil well cementing and drilling fluids, is added to increase the final density to 20 to 30 pounds per gallon. A viscosity reducing admixture such as condensed polynaphthalene sulfonate, but preferably a salt-tolerant high range water reducer such as Halliburton CFR-3, available from Halliburton Services, in Houston, Tex. is added at a concentration of 0.5 to 2 percent. A set retarding admixture, based on lignosufonates, borates or gluconic acids, which are known in the art, but preferably an organic phosphonic acid such as Amino Tri Methylene Phosphonic Acid, which is made by Monsanto Chemical as a anti-scale additive. Other preferred additives include Fumed Silica, epoxy resins, and butadiene styrene latex emulsion. The above grout formulation, properly proportioned, will form a nonsettling slurry which will remain liquid for several weeks and have a viscosity comparable to butter milk. After several weeks the slurry will harden. After curing for several months it will develop a high compressive strength.

An example of such a slurry is as follows: 90 to 110 parts water (by weight), 150 parts type K cement, 300 to 400 parts powdered hematite (iron oxide), 20 to 40 parts fumed silica, 25 to 35 parts Latex emulsion, 30 to 60 parts CFR-3, and 0.2 to 0.8 parts organic phosphonic acid. This grout has a very low water content and produces a final product which can withstand very dry environments.

An alternative slurry may be used if the site characteristics require a flexible barrier material. This slurry would be similar to the above slurry but the cement content would be reduced to 50 parts cement and the water replaced with a 6 to 8 percent prehydrated bentonite slurry modified with 1 percent sodium lignosufonate in place of the other set retarder. This formula will form a dense clay-like grout which will have plasticity similar to native clay.

Another alternative grout may be made by adding powdered hematite or a cement grout slurry containing hematite to an epoxy resin grout. The preferred epoxy would be CARBRAY 100, distributed by Carter Technologies, Sugar land, Tex. This epoxy has a very low viscosity and can be diluted with water or bentonite slurry. The material, cures to a rubbery product which is stable in a variety of moist environments. This epoxy may also be mixed with dry bentonite and powdered hematite to form a lower cost, but still flexible, product.

Another useful grout material is molten paraffin or molten low density polyethylene. These materials will melt at temperatures below the boiling point of water and thus can be applied in field operations with relative ease of cleanup. They can both be modified with surfactants to make them wet the soil better, even when the soil is already wet.

Air-tight Barometric Cap, For All Methods

After the below ground portions of the barrier vault are completed by either method, an above ground cap would be constructed and later covered with soil. This cap is of conventional concrete, clay, and HDPE construction but is designed to be air-tight and would be equipped with passive air pressure sensors on its inner and outer surface. These sensors allow air pressure differentials between the vault and the surroundings to be monitored and recorded. Dry soils are relatively permeable to air pressure. A breach in the vault will allow external air pressure to slowly equalize in the vault. This cap is equipped with pressure sensors which monitor external atmospheric pressure, external soil gas pressure, and internal soil gas pressure under the cap. By comparing these three pressures over time the integrity of the barrier may be verified. Manually operated vent pipes would allow periodic venting of any pressure which accumulates in the structure due to gas generation by the contents. Trace gasses may be introduced to aid in crack detection, location and repair. See FIG. 7. Introducing a small amount of Freon or other suitable tracer gasses into the containment structure should allow any subsurface cracks to be detected by soil gas probes placed around the perimeter. Injecting an odor producing chemical would allow regular monitoring by trained dogs. Dogs can be trained to dig at the source of the leak.

Moisture levels and sound levels inside versus outside the barrier may also be used to monitor leakage. The moisture levels inside the barrier should not change when the exterior levels change. The interior moisture levels may be reduced by circulating dry air through the interior of the structure. Passive sound sensors inside the containment structure can detect stress cracking of the rock-like barrier material as it occurs. Four buried acoustic transducers outside the structure alternately sweeping frequencies from 20 to 60,000 cycles per second would allow several acoustic sensors inside and outside the structure to pick up information that could indicate both the location and magnitude of a crack. The attenuation of different frequencies can indicate the size of a crack.

The preferred method of construction varies greatly according to the size and environmental conditions. An example of such construction for a 300 foot by 300 foot cap in Idaho is as follows. The hardened surface of the perimeter trench is smoothed and a resilient rubbery material such as Carbray 100 epoxy, or silicone caulk is layered on to its surface. A layer of permeable sand is placed within the boundary of the perimeter trench to a depth of 1 foot on the edges sloping to 3 foot deep in the center. A geo-textile high density polyethylene top liner sheet fabricated by fusion bonding methods is placed over the site extending over the seal material and fusion bonded to the bottom liner extending out of the perimeter trench. A geo-textile is installed on top of the top HDPE liner with post tensioning and reinforcing installed above. A layer of sand with bitter tasting additives like pepper, alum, and borax is spread over the liner and a Low permeability concrete is cast on top of it to further discourage insects, plants, and rodents. A clay and soil cap is constructed above using these same additives to bury the concrete cap well below the frost line.

In the event of a breach, ports into the finished vault can be used to inject a small amount of tracer gas such as common R-12 Freon or R-134 or similar fluorocarbons, which will diffuse through the entire vault. Leakage of even trace amounts of this gas through the wall can be sensed by an inexpensive portable detector at the perimeter surface and on the top cap, thus indicating the general area of the leak. An odor producing chemical could also be introduced into the vault. Trained dogs can then be used to routinely inspect the cap and perimeter areas. It is well established that dogs can detect concentrations of oderants more reliably, and in smaller concentrations than currently available instruments. Moisture levels could also be used to verify isolation. Hollow pipes, placed into the wall and floor of the vault while in the liquid state may be used to perform radio frequency, electro-resistivity, or acoustic logging in the walls of the vault to locate cracks even if they do not cause a leak. Several acoustic transducers outside the vault sweeping from 20 to 60,000 cycles per second picked up by sensors buried in the interior of the structure could be used to locate cracks. Stress cracks will make sounds as they occur and can be passively detected. The preferred grout material would have a low electrical conductivity to allow resistive logging between the inside and the outside of the containment structure.

Significant damage to the cap of the vault could be repaired by conventional means including epoxy crack injection. Damage to side walls could be repaired by excavating a narrow trench along the wall and casting new concrete in place. Traditional chemical grouting methods could also be used. Damage to the floor of the vault could be repaired by flooding the vault with a water-thin chemical grout such as sodium silicate, polyacrylamide, or epoxy. It should also be possible to construct an entirely new containment barrier under an existing one.

VARIATIONS OF THE METHOD
Bottom First Burial Trench Method

There are a number of burial trenches in Idaho which are approximately 20 feet wide by 15 feet deep by 500 to 1700 feet long. These trenches are typically parallel and about 30 feet apart. They contain randomly dumped undocumented low level waste. The trenches were cut with a dozer down to a basalt rock layer. This basalt rock layer is about 500 feet thick but is located over the Snake River aquifer. The rock is fractured and is not considered to be a long term confining layer.

Directionally drilled holes would be placed along the bottom outboard edges of a trench at the desired depth. This could be well into the basalt rock layer. These pilot holes would curve back to the surface on each end of the burial trench. Diamond wire quarry saw cables, attached to both ends of a pipe, preferably 2-3/8 inch oil well steel tubing, would be pulled into each hole as the drill pipe is removed.

The cables from one hole to another would be joined at the surface into a continuous length and threaded through the wire saw machine. Two separate, bermed, elevated pits "A" and "B" would be constructed around each of the pilot hole openings on the wire saw machine end of the burial trench. A single trench "C" would be constructed connecting both of the pilot holes on the opposite end of the burial trench. A dense drilling fluid pumped into the "A" pit will flow through the number 1 pilot hole to the "C" trench and back through the number 2 pilot hole to pit "B". The fluid arriving in pit "B" would be reprocessed and placed back in pit "A". Grout could also be pumped through the pipes as described above.

After this continuous flow is established the wire saw machine would feed cable into the number one pilot hole while pulling the cable from the number 2 pilot hole. The cut would begin at the "C" trench and proceed toward the wire saw machine, as the machine moves backward along its tracks. Periodically a new wire saw cable would be spliced into the system. The steel pipes can be used to pull additional cables into position if a cable breaks in service, or to provide a flow of cutting fluid to a specific area. As the cut progresses the entire burial trench will be undercut and supported on a half inch thick layer of the dense cutting fluid.

The properties and stability of this fluid are, of course critical to the process. The fluid must have a density greater than the soil and rock above it and be fluid enough that it flows and transmits hydrostatic pressure effectively through a half inch thick cut. It's fluid loss characteristics must also be tailored to plug small fissures in the permeable rock without plugging the half inch thick cut. Large vertical cracks and fissures are a common feature in the basaltic rock of Idaho. If the wiresaw encounters cracks which cannot be filled, one or more of the pulling pipes will be used to inject a sodium silicate solution into the cut. This material will cause the grout to become viscous very rapidly and plug large openings.

After completion of the bottom cut, sidewall trenches would be excavated by conventional means such as backhoes under a slurry of low viscosity dense grout. These trenches would begin at one end and proceed down both sides at once to construct a trench around the entire perimeter. When the sidewall trench intersects the bottom cut the dense grout will flow into the bottom cut and provide a net positive lifting force on the order of 1 to 5 pounds per square foot. (Not enough to shear the soil and rock but enough to lift it once it is no longer restrained.) As the sidewall cuts proceed down the length of the burial trench the elasticity of the soil and rock will allow the block to lift out of the ground on the free end. Once the entire length of the block is free floating, additional grout could be added to increase the thickness of the grout layer. In very long trenches the soil block may rise to full design elevation before the excavators reach the far end of the site. See FIG. 10.

Side First Burial Trench Method

An alternate method of construction may be used in soil or rock which may be cut more rapidly. This method is expected to be useful in hard soil in which a trench will stand open without support and has little chance of large fractures or voids. In this method the vertical perimeter trench is first excavated to full depth. The wire sawing equipment is then positioned in the trench to cut loose the base of the block on a horizontal plane. This may be accomplished by placing cable pulleys in the trench or by entering the base of one end of the trench with directional drilled holes, through which the cable saw is threaded. The trench will be filled with a super dense grout which is denser than the soil block and which is designed to remain fluid during the duration of the work. As the cut begins, the super dense grout fills the trench and enters the gap cut by the wire saw to provide solids removal, cooling and buoyancy for the block. The cable saw for this work may require diamond abrasives in rock but in soil may use steel cable or steel chain cutting elements. In this method the grout will fill the void behind the cable as it cuts.

As the wire saw undercuts the block, buoyancy of the super dense grout will cause the end of the block which has been undercut to rise slightly as the grout flows into the horizontal cut. Additional grout will be added to the trench to maintain a level sufficient to cause a small but measurable rise in the free end of the block. After the under-cutting process is complete additional grout will be added to the trench to cause the entire block to rise to the desired elevation. (18 to 36 inches typical) Berms may be constructed around the outer perimeter of the trench to allow greater lift height.

In this method the set properties of the super dense grout must be delayed until the cut is complete. This method may not require directional drilling at sites where deep conventional excavation of the perimeter trench is possible. This method forms a rectangular block instead of a gently curved basin structure. Additional sloping excavations on each end could be added to facilitate introduction of a plastic liner material.

Direct Pull Cable Method

A special variation of this method is possible in very soft soil or in a small test site. A trench is excavated dry in a U shape with the ends of the U tapering back to the surface and a cross ditch in the full depth portion such that the waste area is surrounded. A steel cable is laid in the bottom of the trench with ends extending from the bottom of the U and connecting to a pulling means such as a large dozer. The tapering portion of the trench is backfilled to hold the cables in place. The remaining trench is filled with a grout that is more dense than the soil but still fluid. The dozer pulls the cable through the soft soil like a cheese slicer, making a cut which is instantly filled with grout. This action forms a continuous layer of grout under the soil block which thickens as the grout displaces the block upward. Anchor cables keep the soil block centered in the excavation. When the grout hardens it will form a seamless basement structure.

Vertical Cylindrical Block Method

Another alternate method involves forming a directionally drilled hole which enters the ground outside the waste area perimeter, descends to depth and levels off, proceeds around the perimeter of the area to be isolated, (completely encircling it), and then returns to the surface near the point of entry. The wire saw cable is drawn through this circular path as the drill is withdrawn. As the wire saw tightens it cuts under the area to be isolated. A large circular cut is formed under the site. See FIG. 8. The cut is filled with dense fluid as it is cut, as is done in the preferred method. This dense fluid fills the cut and the directionally drilled holes back to the surface to provide hydrostatic support for the block of soil. This dense fluid may be a nonhardening material which could remain in place for many months before the next phase of the project. The fluid would be designed to be slightly heavier or lighter than the grout and would have the ability to seal off small leak pathways or permeable formations.

After the bottom horizontal cut is formed, a perimeter trench is conventionally excavated within the boundaries of the horizontal circular cut and through it. This trench may be rectangular or curved according to the capability of the excavating equipment. This trench may be cut "dry" or excavated under a super dense grout slurry. If excavated dry, the dense fluid will flow out of the horizontal cut and allow the cut to close near the trench. This also provides visual evidence that the horizontal cut has been intersected. If the trench is excavated under a super dense grout slurry the slurry will balance the hydrostatic pressure of the dense fluid in the horizontal cut, or overcome it and flow into the horizontal cut. Optionally both methods be used at the same time on opposite sides of the block. As the slurry filled perimeter trench cuts through the horizontal cut its super dense grout will enter the horizontal cut and cause the block to lift. It may also be desirable to cut to a percentage of full depth with a dry trench, and then complete the intersection with the trench filled with super dense grout.

Forming Barriers With Molten Paraffin

Wiresaw cuts may also be made using a molten paraffin which is pumped into the cut through the pulling pipes in the same manner as with dense grout. Pulling pipes may include circulation loops to keep paraffin from hardening around the pipes. In this method the paraffin hardens only a few feet behind the cutting cable. The liquid area is a thin arc between the pilot holes, typically from 1 to 3 inches thick. This limits the overburden stress on the soil so that the barrier does not get pinched out. These grouts can also be modified with powdered iron oxide to make them more dense than the soil to facilitate a buoyant lift barrier. However it is also possible to use a thermoplastic material like paraffin to construct a thin barrier which relies on rapid hardening to prevent subsidence. Subsidence forces are managed by keeping the one horizontal dimension of the cut sufficiently narrow that the structural strength of the soil overburden is enough to prevent collapse. A two component chemical grout may also be applied in a similar manner with the pulling pipe containing a concentric inner pipe supplying the second component and a nozzle constructed so as to receive flow of both components and mix them together. This could also be done with two separate pipes tethered together or inside a larger pipe. The grout need only be injected on the side of the cut from which the cable moves inward. The movement of the cable through the ground creates a pumping action which causes the greater portion of the grout to follow the movement of the cable around the catenary arc of the cut and back to the surface trench.

Molten paraffin, circulated through a catenary arcuate tube at high pressure and rate while the tube itself is reciprocated through directionally drilled holes to the advancing cut. Typical pressures would be from 2,000 psi to 10,000 psi controlled by a spring loaded pinch valve on the recirculation line which automatically limits the pressure in the line. Circulation rates are sufficient to prevent particles from settling out and to keep temperature uniform. Holes or hardened ports in the forward facing surface of the tube eject the heated liquid into the soil at high kinetic energy causing the soil to be eroded and substantially replaced by the molten paraffin. This allows the tube to advance forward laterally. These ports, or "jets" may be fabricated by brazing a tungsten carbide nozzle flush with the surface of the tube. Portions of the surface of the tube may be covered with an abrasive grit such as tungsten carbide imbedded in an epoxy coating, or by weld deposited hard facing. Rotating both ends of the tube slightly after each pulling stroke allows for a single jet to cut a path wider than the tube. An example of such a rotation sequence would be 0°, +5°, 0°, −5°, 0°, +5°. By rotating the tube in small increments it is possible to sweep the entire soil area in front of the tube with a fixed position jet. In previous tests of soil jetting devices the inventor has noted that the width of the cut formed by a single jet varies significantly with soil type and jetting factors. If the jets do not make a cut at least as thick as the diameter of the tube then the device can not advance except by mechanical abrasion. The ends of the pipe may be automatically rotated by a mechanical "J-Slot" mechanism such as is common in the art of oil well down-hole tools. The mechanism rotates one increment each time the tube is placed in tension and released.

As the tube passes laterally through the ground, the paraffin both permeates into the soil and cools to a solid state. Paraffin which fractures away from the barrier will undergo rapid cooling and will harden and seal off. The injection temperature, and the cooling rate are such that the paraffin hardens before a large enough liquid area of the cut exists to allow subsidence of the overburden to pinch out the barrier. Since fresh molten paraffin is always circulating through the tube, the immediate area of the cut will always remain molten even if reciprocation stops. If the pipe breaks or becomes stuck a new tube may be pulled into position by melting a path through the previous cut. An unlimited number of replacement jetting tubes or wire saw cables may be pulled into cutting position by the heated "pulling pipes" which are in the original directionally drilled holes. An abrasive wire saw cable or chain, may also precede the jetting tube by a few feet to cut through hard objects and reduce the stress on the tube.

Another improvement over prior art is the use of the above mentioned molten paraffin applied with conventional jet grouting apparatus. The preferred molten paraffin has a melting point between 120° and 180° F. and is modified by the addition of a surfactant which allows the molten paraffin to soak into soils which are already water wet or damp, as well as dry soils which have a very low permeability to water. An example of such a surfactant includes Fluoroaliphatic polymeric esters such as Flourad™ FC-430 made by the 3M company of St. Paul, Minn. Another useful surfactant blend can be formed from a blend of 9 parts by weight oleic acid, 6 parts alkanolamine, and 6 parts nonionic surfactant such as nonyl phenol ethoxylate. The surfactant, along with an optional oil soluble dye may be added to a tanker truck of molten paraffin which directly feeds the jet grouting equipment. Optionally a bad tasting or bad smelling substance may be added to increase the resistance to rodent and insect damage. When mixed with the soil by the jet grouting process, it produces a water impermeable product. Hot water is pumped through the system prior to the paraffin to heat the piping and also afterward to clean the system. Molten low density polyethylene Homopolymer such as Marcus 4040 which melts at 181.4° F. may be utilized in a similar manner to the paraffin to increase chemical resistance properties. It may also be modified to enhance its performance in wet soils by the additions of surfactant blends. An example of a nonionic blend is 7 parts by weight ethoxylated alcohol, 0.56 parts potassium hydroxide, and 0.21 parts sodium bisulphite. An ionic blend could be made with equal parts by weight of oleic acid and an amine. If polyethylene is used as the primary grout, the HDPE top liner may be fusion bonded directly to the bottom barrier. This material may also be used as a hot melt glue to bond the paraffin to an HDPE top liner. The low density polyethylene homopolymers may be blended with the paraffin wax at a concentration of from 2 to 10 percent weight percent to improve its wetting properties, impermeability, and chemical resistance.

Molten paraffin may be especially useful for constructing barrier vaults in rock which has large cracks or fissures such as the basalt rock layers which exist in Idaho. As the molten wax enters a fissure and begins to escape from the area where the barrier is to be formed it loses heat and solidifies quickly. This tends to seal off the fissure. This approach should work in both water saturated and vadose zones.

Those skilled in the art who now have the benefit of the present disclosure will appreciate that the present invention may take many forms and embodiments. Some embodiments have been described so as to give an understanding of the invention. It is intended that these embodiments should be illustrative, and not limiting of the present invention. Rather, it is intended that the invention cover all modifications, equivalents and alternatives falling within the spirit and scope of the invention as defined by the appended claims.

What is claimed is:

1. A method for constructing a subterranean containment structure, comprising the steps of:

(a) placing a pipe having at least one port formed therein in a subterranean site to be contained;

(b) pumping a molten wax under pressure through the at least one port in the pipe disposed in the subterranean site to be contained while said pipe is moved and rotated so that subterranean materials proximal to the pipe are impacted by the molten wax;

(c) relocating the pipe to areas adjacent to the subterranean site; and (d) repeating steps (a) through (c) until the subterranean site to be contained is saturated with the molten wax.

2. The method for constructing a subterranean containment structure according to claim 1, wherein the molten wax is a thermoplastic material modified to make it water-miscible and able to wet and adhere to moist surfaces and to permeate into water impermeable materials.

* * * * *